United States Patent
Takeda

(10) Patent No.: US 9,641,838 B2
(45) Date of Patent: May 2, 2017

(54) MOVING IMAGE CODING APPARATUS, METHOD AND PROGRAM

(71) Applicant: CANON KABUSHIKI KAISHA, Tokyo (JP)

(72) Inventor: Eishi Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 14/096,118

(22) Filed: Dec. 4, 2013

(65) Prior Publication Data

US 2014/0161185 A1 Jun. 12, 2014

(30) Foreign Application Priority Data

Dec. 12, 2012 (JP) ................................ 2012-271615

(51) Int. Cl.
| | |
|---|---|
| *H04N 19/00* | (2014.01) |
| *H04N 19/51* | (2014.01) |
| *H04N 19/463* | (2014.01) |
| *H04N 19/513* | (2014.01) |
| *H04N 19/186* | (2014.01) |

(52) U.S. Cl.
CPC ..... *H04N 19/00703* (2013.01); *H04N 19/186* (2014.11); *H04N 19/463* (2014.11); *H04N 19/521* (2014.11)

(58) Field of Classification Search
CPC ... H04N 19/186; H04N 19/463; H04N 19/521
USPC ...................................................... 375/240.16
See application file for complete search history.

(56) References Cited

U.S. PATENT DOCUMENTS

| | | | | |
|---|---|---|---|---|
| 2005/0237433 | A1* | 10/2005 | Van Dijk | ............. G09G 3/2003 348/702 |
| 2011/0243436 | A1 | 10/2011 | Seregin et al. | |
| 2012/0250769 | A1* | 10/2012 | Bross | ..................... H04N 19/56 375/240.16 |

FOREIGN PATENT DOCUMENTS

| | | |
|---|---|---|
| CN | 101491105 A | 7/2009 |
| CN | 101616329 A | 12/2009 |
| CN | 102450018 A | 5/2012 |
| JP | 2007-133823 A | 5/2007 |
| WO | 2011/155378 A1 | 12/2011 |

OTHER PUBLICATIONS

Office Action for corresponding Chinese Application No. 201310680905.3 mailed Jun. 29, 2016.

* cited by examiner

*Primary Examiner* — Jeffery Williams
(74) *Attorney, Agent, or Firm* — Carter, DeLuca, Farrell & Schmidt, LLP

(57) ABSTRACT

The moving image coding apparatus generates at least one motion prediction information for prediction-coding a coding target image of color components, for each color component, determines a correlation relationship of at least one motion prediction information of each of the generated color components, determines a color component which is to be a correction target, on the basis of a result of the determination of the correlation relationship, and corrects at least one motion prediction information of the determined color component using the motion prediction information corresponding to at least one color component among the other color components.

15 Claims, 25 Drawing Sheets

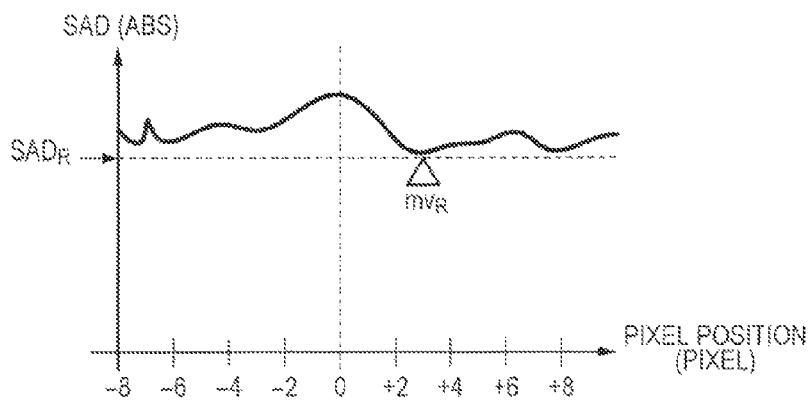
FIG. 16A  INTER-PICTURE DIFFERENCE VALUE OF R COMPONENT
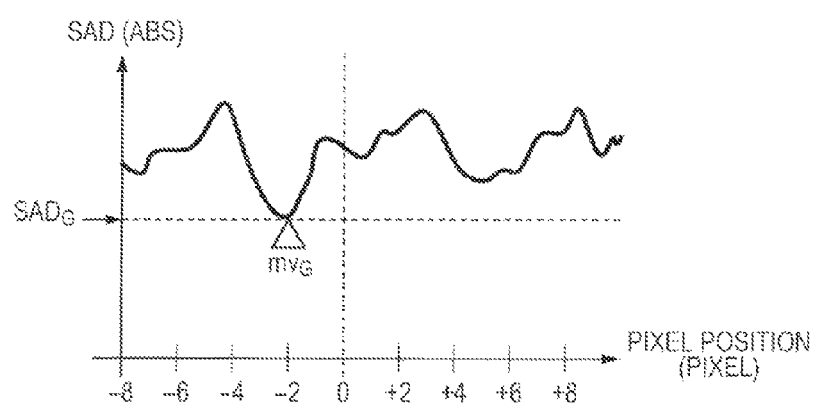
FIG. 16B  INTER-PICTURE DIFFERENCE VALUE OF G COMPONENT
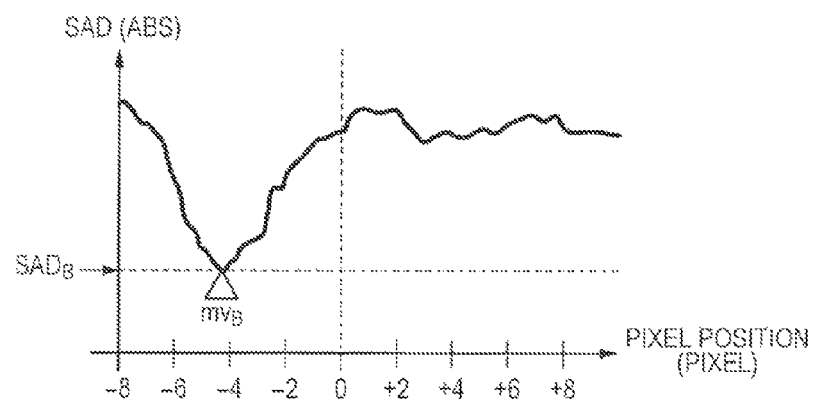
FIG. 16C  INTER-PICTURE DIFFERENCE VALUE OF B COMPONENT

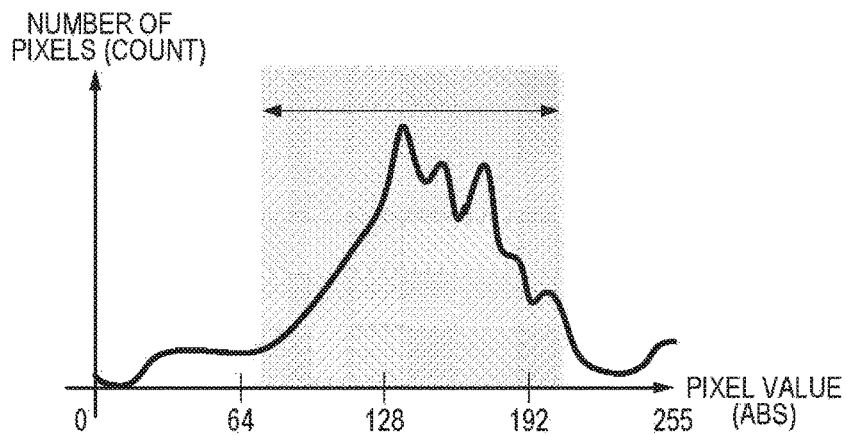
FIG. 18A  PIXEL VALUE HISTOGRAM OF R COMPONENT
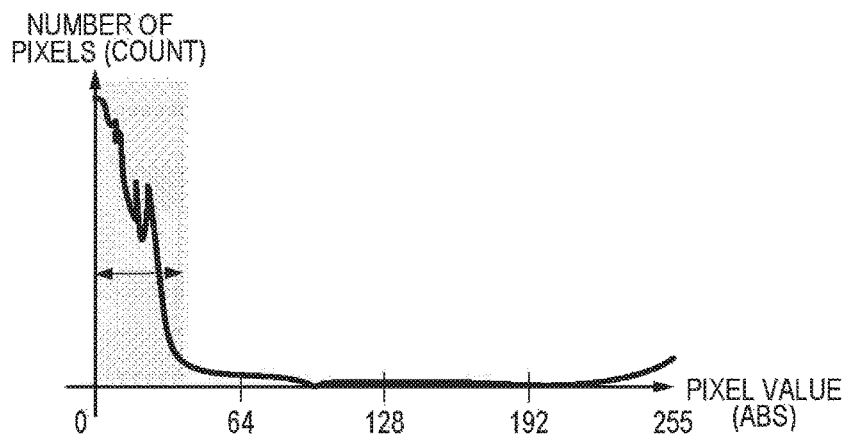
FIG. 18B  PIXEL VALUE HISTOGRAM OF G COMPONENT
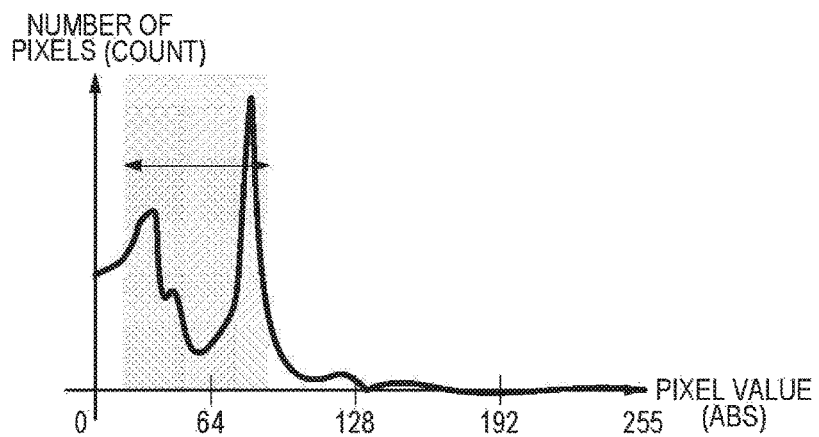
FIG. 18C  PIXEL VALUE HISTOGRAM OF B COMPONENT

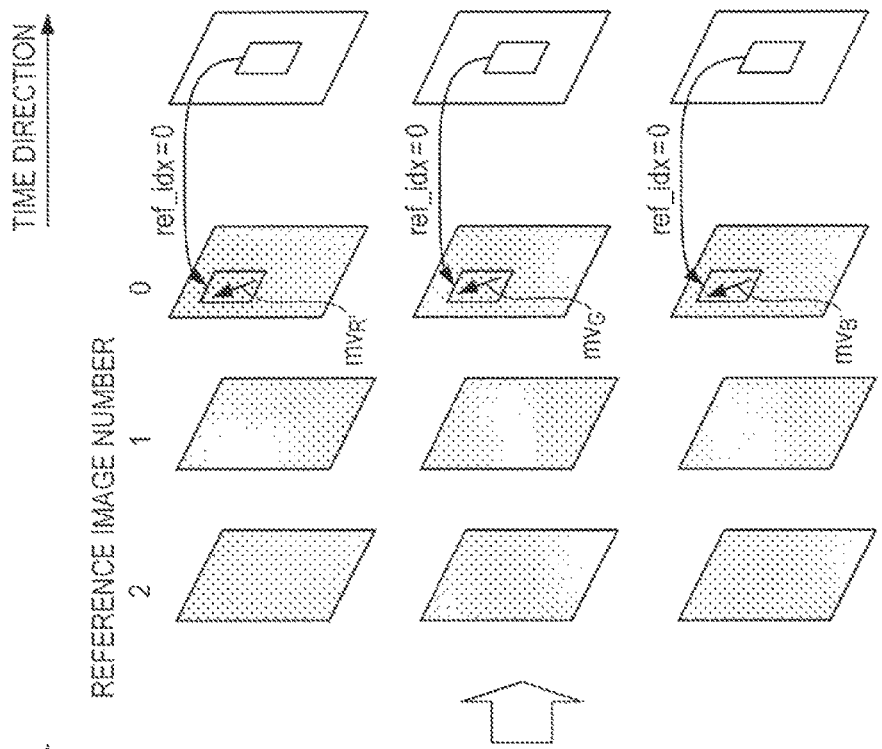
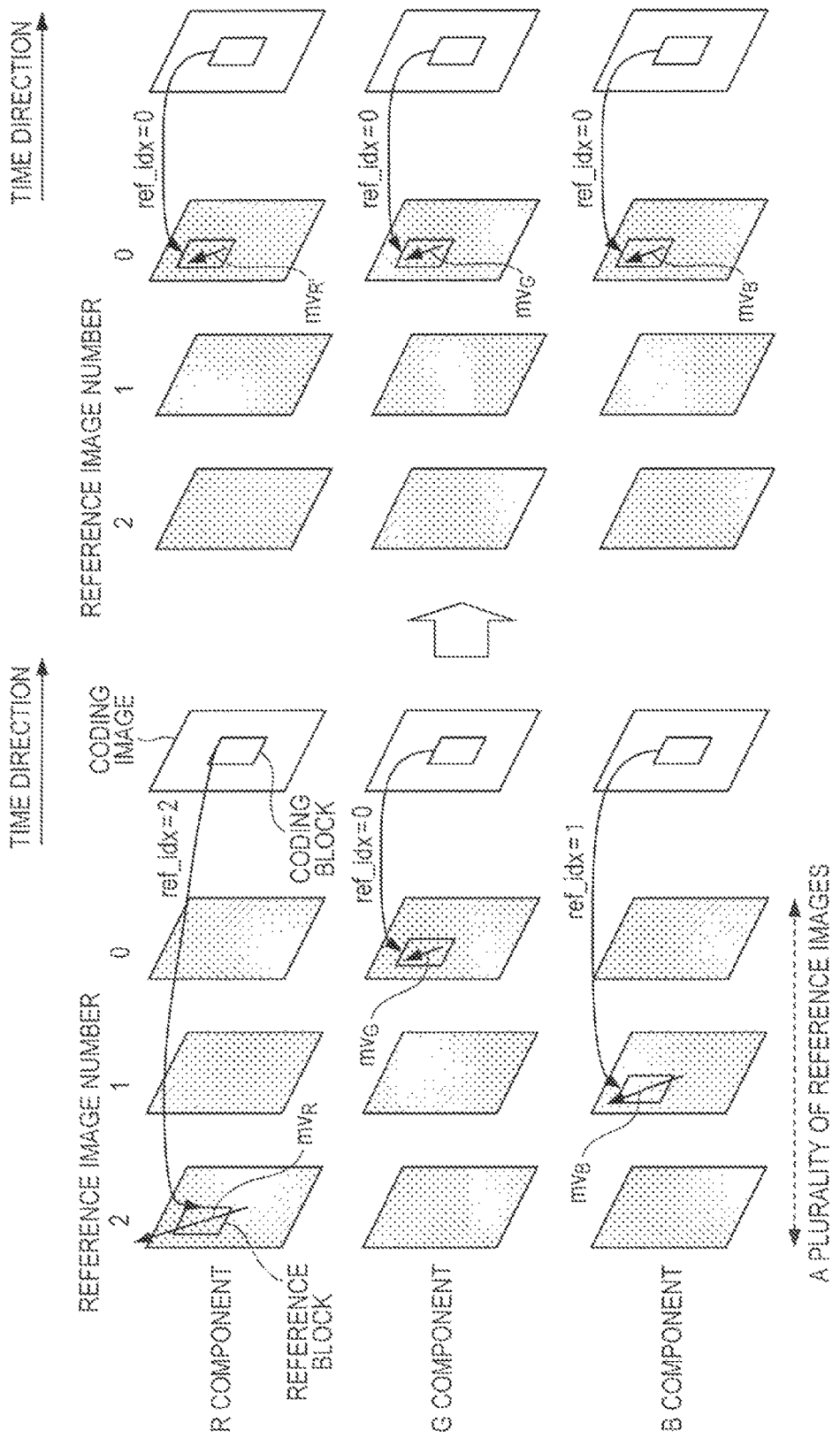
FIG. 23A
FIG. 23B

MOVING IMAGE CODING APPARATUS, METHOD AND PROGRAM

BACKGROUND OF THE INVENTION

Field of the Invention

The present invention relates to an image signal coding apparatus, and particularly to a moving image coding apparatus and method that motion-compensation prediction-code a moving image signal including a plurality of color components having the same sample ratio, independently for each color component.

Description of the Related Art

Conventionally, a digital video camera has been well known as a camera-integrated moving image recording apparatus that takes an image of an object, compression-codes moving image data obtained by taking the image, and records the data.

MPEG2 capable of compression at a high compression rate using inter-frame motion prediction has typically been used as a compression coding scheme. In particular, H.264 achieving a high compression rate using a more complex prediction scheme has also been used recently. These compression coding schemes adopt a standardized input signal format, which is mainly called 4:2:0 format.

According to the 4:2:0 format, a color moving image signal, such as of RGB, is converted into a luminance component (Y) and two color difference components (Cb, Cr), and the number of samples of the color difference component is reduced to half of that of the luminance component both in vertical and horizontal directions.

The color difference component has lower visibility than the luminance component has. Accordingly, the amount of original information of a coding target is reduced by down-sampling of the color difference component before coding. Instead, the 4:2:2 format that down-samples, to the half, the color difference component only in the horizontal direction sometimes is used as a format for business use, such as a format of a broadcast video source.

Recently, according to highly-increasing resolution of degree of half-tone of a display, a coding scheme has been developed that codes the color difference component at the same number of samples as that of the luminance component without down-sampling the color difference component.

A format having the same number of samples of the color difference component as that of the luminance component is called the 4:4:4 format.

In coding of 4:2:0 format, information for motion-compensation prediction is multiplexed only on the luminance component, and motion compensation is performed on the color difference component using the information of the luminance component.

The coding of the 4:2:0 format is accomplished with the features that almost of image information is concentrated in the luminance component and distortion visibility is higher for the luminance component than for the color difference component so that the color difference component makes less contribution to image reproductivity.

In contrast, in coding of the 4:4:4 format, the three components have equivalent image information amount. Accordingly, a coding scheme different from the conventional coding scheme which assumes that the image information largely depends on one component as in the 4:2:0 format is desired.

A coding scheme in conformity with the 4:4:4 format is disclosed in, for instance, Japanese Patent Application Laid-Open No. 2007-133823. According to Japanese Patent Application Laid-Open No. 2007-133823, to the input image including three primary colors of an RGB signal, motion vector detection is performed on both the G component and luminance component (Y component) generated from the RGB component, and subsequently the correlation between each vector is calculated. If the correlation between the G component vector and the Y component vector is high, the motion vector of the Y component is applied to the motion vectors of the R, G and B components.

The coding process of the coding scheme in conformity with the 4:4:4 format performs motion prediction for each color component. Accordingly, no distinct difference in the inter-picture difference value sometimes appears between the reference image and the coding-target image on a certain color component.

As a result, unfortunately, coding is performed with the motion vector indicating the image position different from the actual motion of the object being used as it is.

As to coding efficiency, since a coordinate position achieving the minimum in a search range is indicated, there is an advantage that can achieve control to reduce the vector coding amount in terms of the amount of data of an output coded bit stream.

However, the quantization parameters of different color components in the coding block at the same position or therearound may vary, and the motion vector of the color component deviates from actual motion of an object, thereby there may exist a fear that influence on image quality, such as out-of-color registration, occurs.

According to the method disclosed in Japanese Patent Application Laid-Open No. 2007-133823, motion vector detection is not performed on B and R color components. Instead, the motion vector of the Y or G component is solely applied to all the color components. Accordingly, the problem, such as the out-of-color registration, cannot be solved.

SUMMARY OF THE INVENTION

In view of the above described points, it is an aspect of the present invention to reduce image quality deterioration due to out-of-color registration in coding that motion-predicts, for each color component, an image signal including a plurality of color components having the same sample ratio.

To solve the problem, according to the present invention, a moving image coding apparatus that motion-prediction codes a moving image including a plurality of color components on a color component basis, generates at least one piece of motion prediction information for prediction-coding a coding-target image of color components, for each color component, determines a correlation relationship of at least one piece of motion prediction information of each of the generated color components, determines a color component which is to be a correction target, on the basis of a result of the determination of the correlation relationship, and corrects at least one piece of motion prediction information of the determined color component using the motion prediction information corresponding to at least one color component among the other color components.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 16A, 16B and 16C are diagrams illustrating relationship between an inter-picture difference value and a motion vector in motion vector correction according to the second modification of the second embodiment of the present invention.

FIGS. 18A, 18B and 18C are diagrams for illustrating histograms of color components of an image signal in motion vector correction according to the third modification of the second embodiment of the present invention.

FIGS. 23A and 23B are schematic diagrams of correcting the reference image numbers according to the third embodiment of the present invention.

DESCRIPTION OF THE EMBODIMENTS

Various exemplary embodiments, features, and aspects of the present invention will be described in detail below with reference to the drawings.

First Embodiment

System Configuration

Figure 1:
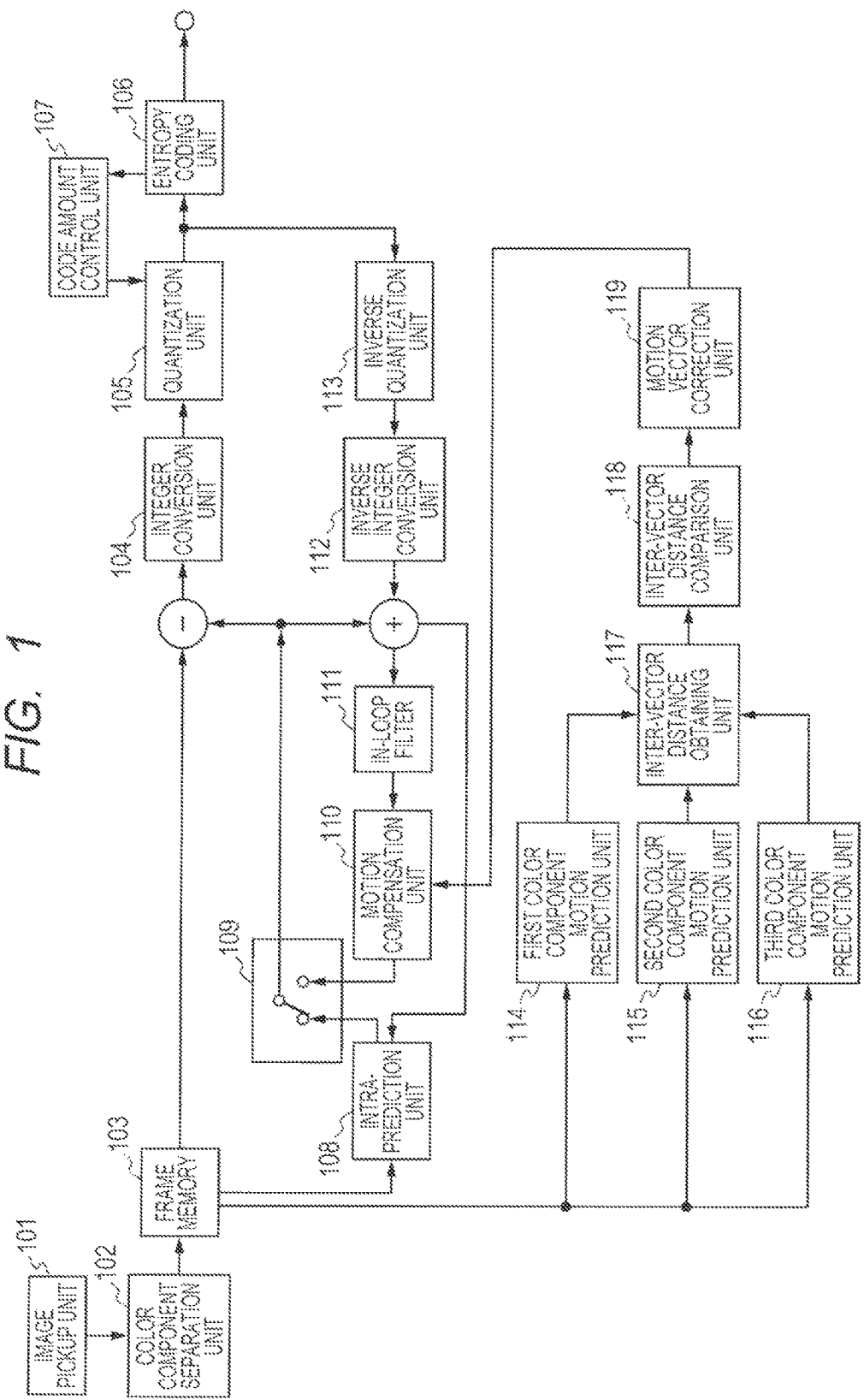
FIG. 1 is a block diagram of a coding system including a moving image coding apparatus according to a first embodiment of the present invention.

FIG. 1 is a block diagram of a moving image coding system in the case where a moving image coding apparatus according to a first embodiment of the present invention is applied to an image pickup apparatus, such as a video camera. In the configuration of FIG. 1, a control unit (CPU) including a processor, not illustrated, controls each component operation according to a program, thereby achieving a coding operation according to the present embodiment.

The moving image coding system includes an image pickup unit 101, a color component separation unit 102, a frame memory 103, an integer conversion unit 104, a quantization unit 105, an entropy coding unit 106, a code amount control unit 107, and an intra-prediction unit 108. This system further includes an intra/inter determination unit 109, a motion compensation unit 110, an in-loop filter 111, an inverse integer conversion unit 112, and an inverse quantization unit 113. Moreover, this system includes a first color component motion prediction unit 114, a second color component motion prediction unit 115, a third color component motion prediction unit 116, an inter-vector distance obtaining unit 117, an inter-vector distance comparison unit 118, and a motion vector correction unit 119.

The moving image coding apparatus according to the present embodiment may be provided as an apparatus which includes the components of the moving image coding system but from which the image pickup unit 101 is excluded and which allows a computer to execute operations according to after-mentioned flowcharts. For instance, this apparatus may be provided as a moving image coding apparatus or method executed by an information processing apparatus, such as a PC, according to a program or partial combination with hardware.

The image pickup unit 101, which includes a camera unit, such as lenses and an image pickup sensor, and an optical unit, allows a sensor to convert an optical signal captured from the lens into an electric signal, and transfers, to a circuit on a subsequent stage, the signal as digital image data converted into a format used for coding.

The color component separation unit 102 separates the digital image data read from the image pickup unit 101 with respect to each of color components of RGB three primary colors, and stores the data in the frame memory 103.

The frame memory 103 is a large-capacity memory capable of storing image data of a plurality of frames, and stores image data transferred from the color component separation unit, and reference image data used in an after-mentioned motion prediction process.

In the present embodiment of the present invention, for the sake of description, input of an image of RGB three primary colors is assumed, and a first color component is an R component, a second color component is a G component, and a third color component is a B component. However, this configuration is not limited thereto in the present invention.

Figure 2:
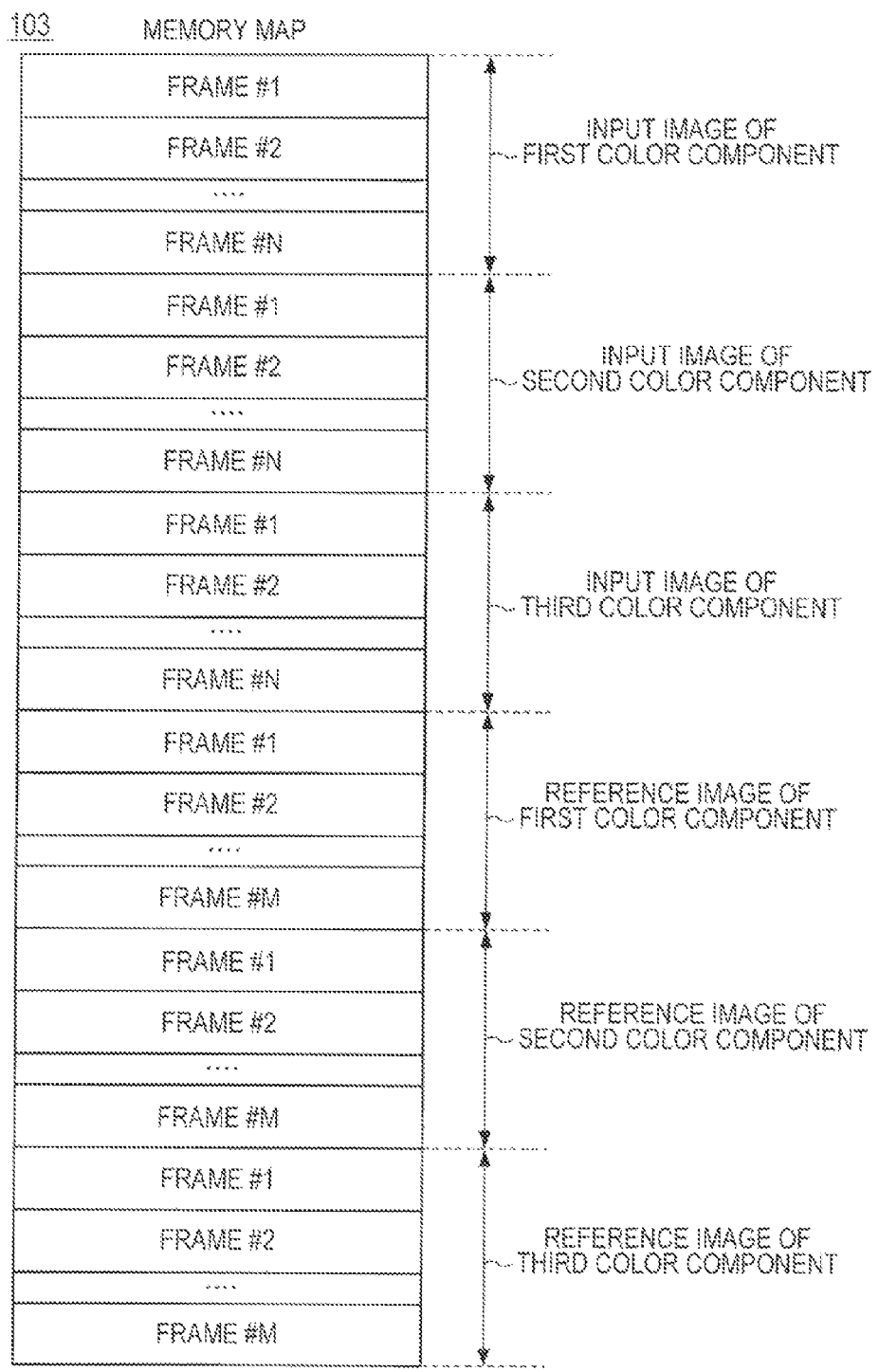
FIG. 2 is a data arrangement diagram of a frame memory of the moving image coding apparatus according to the first embodiment of the present invention.

FIG. 2 illustrates an example of division of a memory region of the frame memory 103.

The frame memory 103 is divided and arranged to store regions for an input image and regions for an after-mentioned reference image by a plurality of frames with respect to each color component.

To reduce the redundancy of image information, through use of spatial correlation where similarity is high at adjacent pixels, the integer conversion unit 104 performs spatial resolution conversion of pixel data on a unit basis of a block of a coding target to convert the pixel data to data in a spatial frequency region.

The quantization unit 105 calculates the quantization step size based on a target code amount set by the code amount control unit 107 on the subsequent stage. The integer conversion unit 104 performs a quantization process on coefficient data converted into the spatial frequency region.

The quantized coefficient data is output to both the entropy coding unit 106 outputting a coded bit stream and the inverse quantization unit 113 for calculating a reference image and a prediction image.

The entropy coding unit 106 performs coded data length compression on coefficient data quantized by the quantization unit 105, or on vectors used in motion prediction in the case of inter-prediction (inter-picture prediction), according to entropy coding using the tendency of appearance probability of bit data, such as the CABAC scheme. The CABAC stands for context-based adaptive binary arithmetic coding.

The code amount control unit 107 obtains the code amount of coded data occurring in the entropy coding unit 106, calculates the target code amount per each frame based on the bit rate and a buffer model, such as VBV, and subsequently performs feedback control of setting the amount in the quantization unit 105.

The intra-prediction unit 108 reads image data of a coding target block from input image data of the frame memory 103, and calculates correlation with intra-prediction images generated from pixel data around the coding target block having already been coded.

The intra-prediction scheme with the highest correlation is selected and notified to the intra/inter determination unit.

The intra/inter determination unit 109 receives the result of the inter-prediction (inter-picture prediction) by the after-mentioned motion compensation unit 110 using motion vectors and the result of the intra-prediction unit 108. The prediction scheme with the minimum inter-picture difference value is selected to generate a prediction image.

The motion compensation unit 110 generates reference image data to be used for inter-coding, through use of the prediction image data subjected to the filter process in the in-loop filter 111 and the motion vectors notified from the after-mentioned motion vector correction unit 119. The generated reference image data is stored in the frame memory 103.

The in-loop filter 111 applies the filter process that reduces the coding distortion (block noise) to the image data acquired by adding the image data output from the inverse integer conversion unit 112 and the prediction image to each other.

The inverse integer conversion unit 112 performs inverse integer conversion on the coefficient data output from the inverse quantization unit 113 into pixel data.

The inverse quantization unit 113 calculates the coefficient data by multiplying again the quantization step size by the coefficient data quantized by the quantization unit 105.

The first color component motion prediction unit 114 pattern-matches the pixel data on a unit basis of a block, on the data of the original image as a coding target stored in the frame memory 103 and the decoded data (reference image data) of the image having already been coded. The first color component motion prediction unit 114 calculates a motion vector, which is motion prediction information. Furthermore, this first color component motion prediction unit 114 generates, as the motion prediction information, number information of the reference image referred to when the motion vector is calculated.

Also in the second color component motion prediction unit 115 and the third color component motion prediction unit 116, the same process is performed although only the color component on the frame memory 103 as a target of motion prediction is different. Thus, each color component is independently prediction-coded.

The inter-vector distance obtaining unit 117 calculates the inter-vector distances from the motion vectors of the color components at the same coding target block position obtained by the first to third color component motion prediction units 114, 115 and 116.

The inter-vector distance comparison unit 118 perform comparison to determine whether the motion vector of a predetermined color component is different from the vectors of the other color components or not based on the inter-vector distance between the color components notified from the inter-vector distance obtaining unit 117.

The motion vector correction unit 119 corrects the motion vector of the color component concerned to obtain another appropriate vector based on the determination result of the inter-vector distance comparison unit 118. The correction vector is output, as coded parameters, to the motion compensation unit 110, and applied for generating a reference image or vector coding.

In the present invention, the aggregation of 16-row×16-column pixel data is called a coding block (or coding target block), and the coding process, such as the motion prediction on a unit of the coding block is performed, unless otherwise specified. The configuration of the moving image coding system including the moving image coding apparatus according to the first embodiment of the present invention has thus been described.

Motion Vector Search

Figure 3:
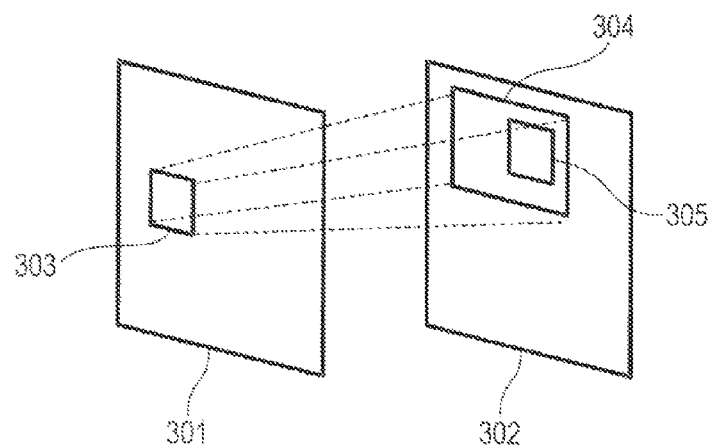
FIG. 3 is a schematic diagram of a motion prediction operation in the moving image coding apparatus according to the first embodiment of the present invention.

A method of searching for the motion vectors in the motion prediction units 114 to 116 of the moving image coding apparatus according to the present embodiment will be described with reference to FIGS. 3 and 4. As the method of searching for motion vectors, pattern matching has been known as a known technique. The pattern matching obtains a pixel coordinate position with the minimum inter-picture difference between the original image frame 301 and the reference image frame 302 on a unit of a coding block.

As represented by the following Expression 1, an inter-picture difference SAD is an evaluation value acquired by accumulating the absolute values of differences of all the pixel values in the coding block image, and is an amount representing the similarity of image data between coding blocks.

$$SAD = \sum_{y=0}^{16}\sum_{x=0}^{16} |PIX_{ref}(x, y) - PIX_{cur}(x, y)| \qquad \text{Expression (1)}$$

Here, PIXref (x, y) corresponds to the pixel value of a coding block 305 to be referred to, and the pixel value, PIXcur (x, y) corresponds to the pixel value of a coding block 303 of a coding target.

Since the amount of processing is enormous, not the entire region of the reference image is searched. According to a typical scheme, a search window 304 is provided that only searches an area covering coding blocks around the coding block 303.

In the search window 304, the position of the coding block 305 to be referred to is moved to obtain the coding block position where the inter-picture difference value SAD between the coding block 305 and the coding block 303 as the coding target is the minimum, thereby determining the motion vector.

Figure 4:
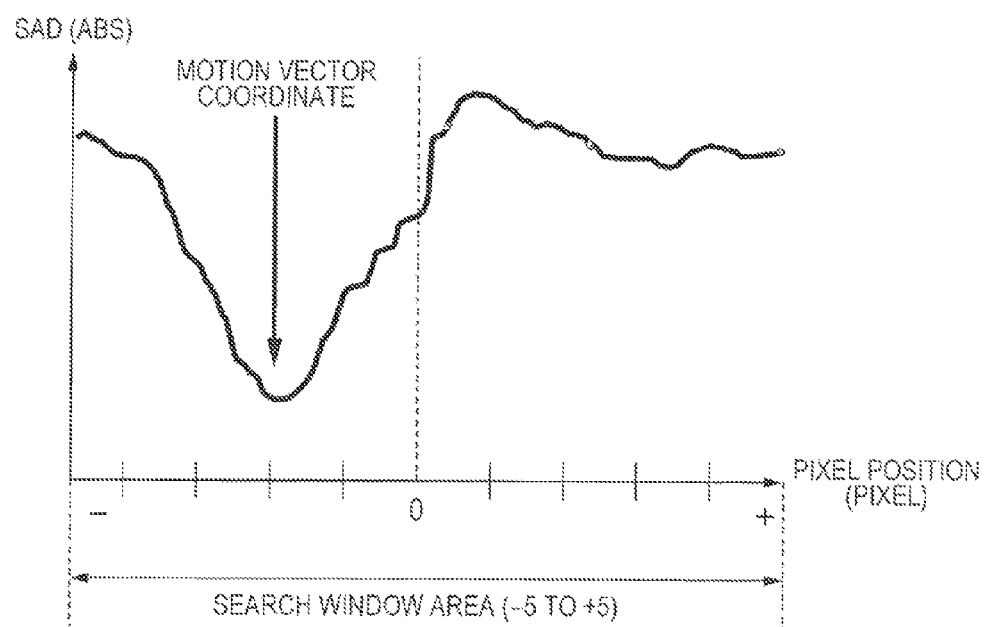
FIG. 4 is a diagram illustrating relationship between an inter-picture difference and a motion vector in motion prediction of the moving image coding apparatus according to the first embodiment of the present invention.

For instance, plotting of the pixel position in the search window and the inter-picture difference value can be represented as a graph illustrated in FIG. 4.

For the sake of simplicity, in the illustrated diagram, the coordinates of the search window are not two-dimensional, in x and y directions, but one-dimensional instead. Accordingly, the motion vector value is one-dimensional. However, the vector value is two-dimensional in actuality.

In the case of the drawing, provided that the position of the coding block of the coding target is the origin and the search window is set to a region of ±5 pixels, the coordinate position −2 where the inter-picture difference value SAD is the minimum is detected.

Thus, the image data is most similar, in the area, between the coding block to be referred to in the coordinate position concerned and the coding block as the coding target, and a picture shift corresponding to −2 pixels can be identified. Accordingly, the motion vector of −2 (one-dimensional) is output.

The present invention performs the motion prediction process in the first to third motion prediction units 114, 115 and 116, for each color component stored in the frame memory 103 in an analogous manner.

Obtaining and Comparing Inter-Vector Distance

Figure 5:
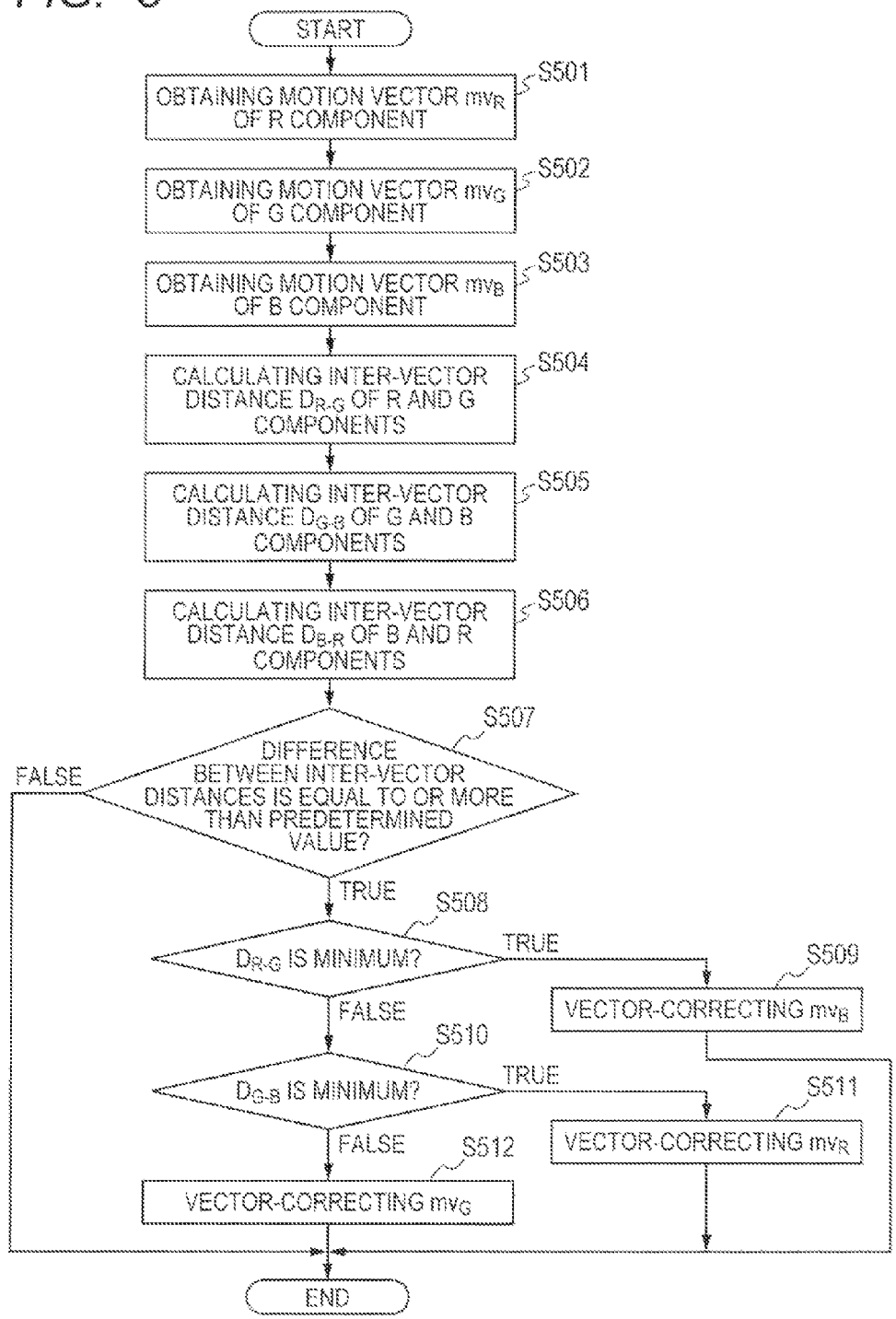
FIG. 5 is a diagram illustrating a flowchart of an operation of correcting the motion vector in the moving image coding apparatus of the first embodiment of the present invention.

Subsequently, a motion vector correction operation of the moving image coding apparatus according to the present embodiment will be described with reference to FIGS. 5 and 6.

The operation is performed in the inter-vector distance obtaining unit 117 and the inter-vector distance comparison unit 118 of the moving image coding apparatus. As described above, the control unit (CPU) that includes a processor, not illustrated, controls each component according to the program, thereby achieving the operation. It is hereinafter provided that analogous control is performed unless otherwise specified.

First, in step S501, the motion vector $mv_R$ of the R component obtained by the motion prediction process is obtained from the first motion prediction unit 114. Likewise, the motion vector $mv_G$ of the G component is obtained from the second motion prediction unit 115 (step S502), and the motion vector $mv_B$ of the B component is obtained from the third motion prediction unit 116 (step S503).

Subsequently, the motion vectors $mv_R$, $mv_G$ and $mv_B$ of three color components are obtained. The inter-vector distances thereof are then calculated by the following Expression (2).

$$D = \sqrt{(mv_x - mv_{x'})^2 + (mv_y - mv_{y'})^2} \qquad \text{Expression (2)}$$

Here, $mv_X$ and $mv_Y$ respectively represent the x component value and y component value of the motion vector on a certain color component.

As described in the example illustrated in FIG. 6, this expression is used for obtaining a scalar D representing the distance between apices of two color component motion vectors and determining the correlation relationship of vectors, which will be described later.

Based on the above expression, the inter-vector distance $D_{R-G}$ (step S504) between the motion vectors of the R component and the G component is calculated. Furthermore, the inter-vector distance $D_{G-B}$ between the motion vectors of the G component and the B component is calculated (step S505). The inter-vector distance $D_{B-R}$ of the motion vectors of the B component and the R component is then calculated (step S506).

Figure 6:
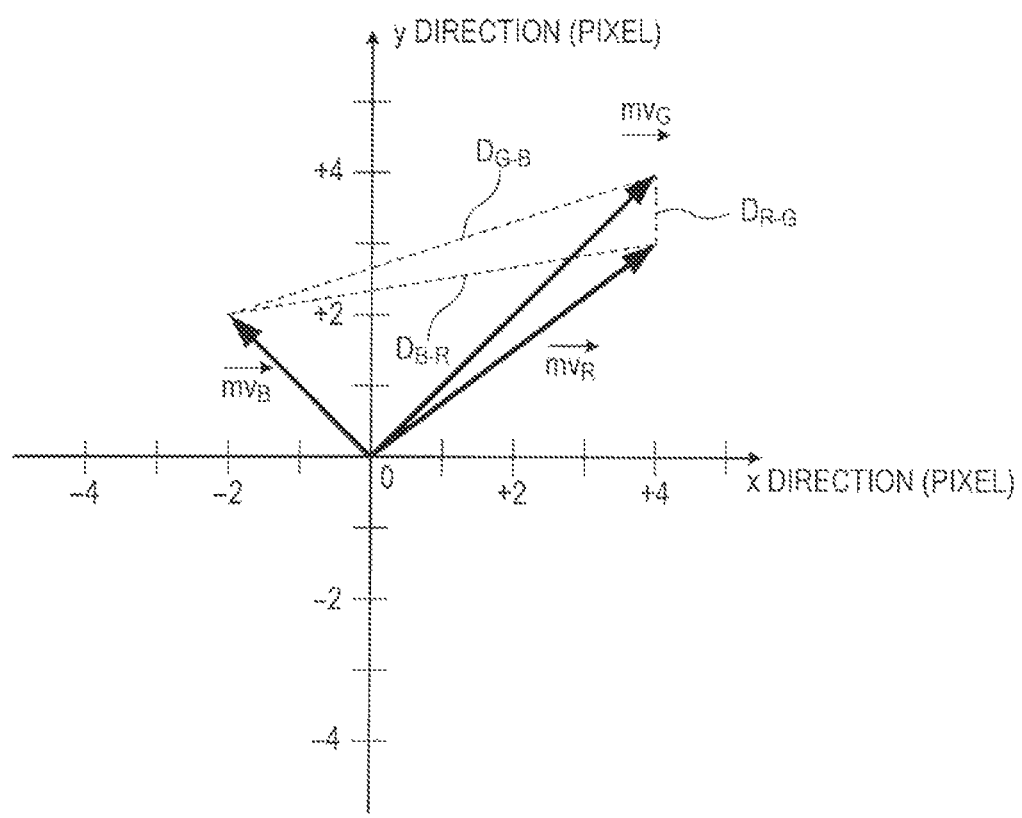
FIG. 6 is a diagram for illustrating the operation of correcting the motion vector according to the first embodiment of the present invention.

In the example of FIG. 6, the motion vectors of the respective color components are calculated as follows.

$mv_R = (4, 3)$, $mv_G = (4, 4)$, and $mv_B = (-2, 2)$.

The inter-vector distances thereof are calculated as follows.

$D_{R-G} = 1$, $D_{G-B} = \sqrt{29}$, and $D_{B-R} = \sqrt{26}$.

Subsequently, the differences between the three color components, which are the inter-vector distances $D_{R-G}$, $D_{G-B}$ and $D_{B-R}$ and obtained in steps S504 to S506 are calculated. It is determined whether every difference is within a predetermined value or not (step S507).

If every inter-vector distance is less than the predetermined value (FALSE in step S507), it is represented that the vector values of the three color components have similar directions and lengths.

As a result, it can be determined that there is a high probability that the vector search process detects the motion of the object imaged by the actual image pickup unit 101. Thus, the motion vector correction process of the present invention is not required. Accordingly, this flow is finished.

In contrast, any of the inter-vector distances is equal to or more than the predetermined value (TRUE in step S507), it is determined that the motion vector of a predetermined color signal is required to be corrected, and a color component of the vector to be corrected is identified by the following step.

A specific method of identifying the color component will be described below.

In steps S508 to S512, the minimum values are sequentially determined on the three inter-vector distances, based on the identification method, thereby obtaining the motion vector to be corrected.

In step S508, it is determined whether the inter-vector distance $D_{R-G}$ of the R component and the G component is the minimum among the three inter-vector distances or not. If the distance is the minimum value (TRUE in step S508), the motion vector of the B component is determined as the motion vector to be corrected, and this operation is finished (step S509).

In contrast, if the $D_{R-G}$ is not the minimum value (FALSE in step S508), the processing transitions to step S510.

In step S510, it is determined whether the inter-vector distance $D_{G-B}$ of the G component and the B component is the minimum among the three inter-vector distances or not. If the distance is the minimum value (TRUE in step S511), the motion vector of the R component is determined as the motion vector to be corrected, and this flow is finished (step S511).

In contrast, if the $D_{G-B}$ is not the minimum value (FALSE in step S510), the $D_{B-R}$ is the minimum value. Accordingly, the motion vector of the G component is determined as the motion vector to be corrected, and this flow is finished (step S512).

According to the example where the vector values in FIG. 6 are used and this operation is executed, the inter-vector distance $D_{R-G}$ has a minimum value less than the minimum values of the other two inter-vector distances $D_{G-B}$ and $D_{B-R}$. Accordingly, the motion vector $mv_B$ of the B component, which is not to be calculated, is determined as the motion vector of the correction target.

The operation of obtaining, comparing and determining the inter-vector distances of the motion vectors of the color components in the moving image coding apparatus according to the present embodiment has thus been described.

Motion Vector Correction

Figure 7:
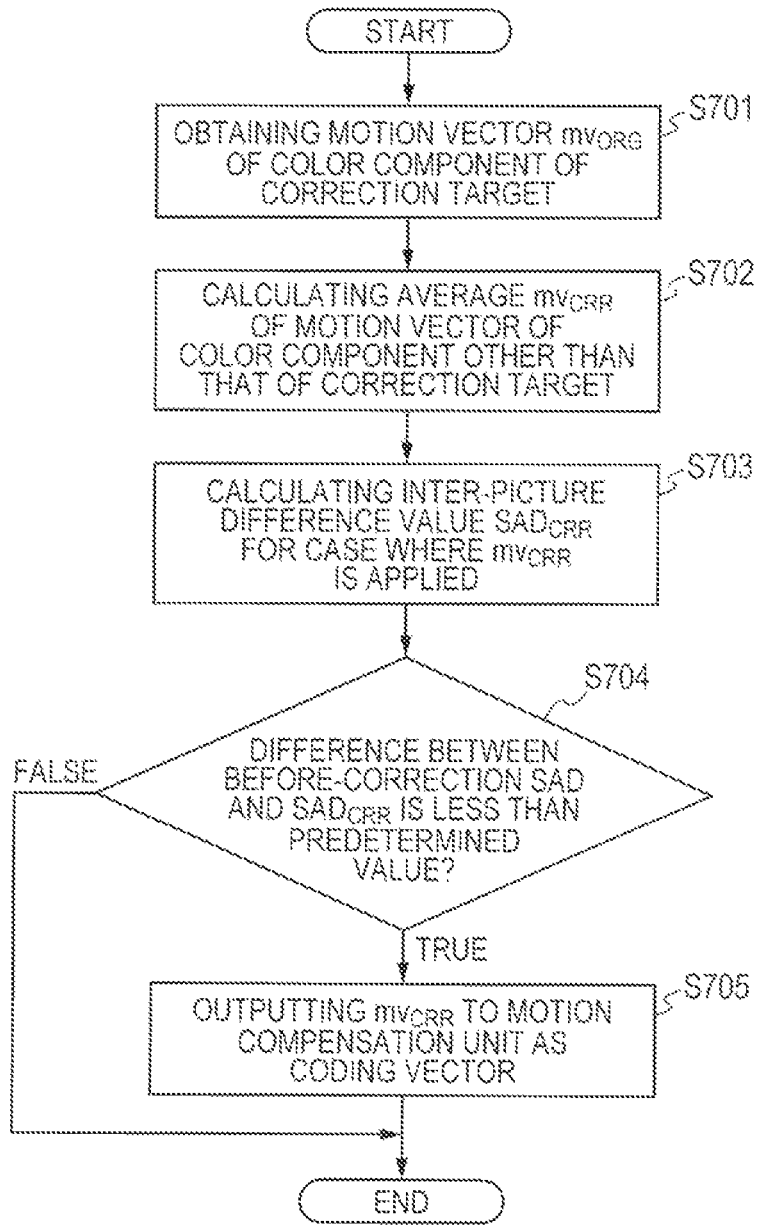
FIG. 7 is a diagram illustrating a flowchart of the operation of correcting the motion vector in the moving image coding apparatus according to the first embodiment of the present invention.

Subsequently, a motion vector correcting operation of the present embodiment will be described with reference to a flowchart of FIG. 7.

The operation is executed by the motion vector correction unit 119 of the moving image coding apparatus.

First, in step S701, the motion vector $mv_{ORG}$ of the color component of the correction target, being obtained as acquisition of the inter-vector distance and the output result of the comparing and determining flow, is obtained.

The motion vector $mv_{ORG}$ is the motion vector value of the color component of any of the R, G and B components.

If the comparison and determination determines that there is no vector to be corrected, the correction is not performed.

Subsequently, in step S702, two motion vectors with components that are not the vector correction target are obtained, the average of those vectors is obtained, and the vector $mv_{CRR}$ for correction is calculated.

For instance, as the result of obtaining and comparing the inter-vector distance, if it is determined that the motion vector $mv_R$ of the R signal is required to be corrected, the average vector of the motion vectors $mv_G$ and $mv_B$ of the G component and the B component is obtained by the following expression, thereby determining the vector for correction.

$$mv_{CRR} = \frac{mv_G + mv_B}{2} \qquad \text{Expression (3)}$$
$$= \left\{ \frac{mv_{Gx} + mv_{Bx}}{2}, \frac{mv_{Gy} + mv_{By}}{2} \right\}$$

An inter-picture difference value $SAD_{CRR}$ in the case of applying the vector for correction $mv_{CRR}$ obtained in the above step to the coding block of the color component as the vector correction target is calculated (step S703).

Subsequently, in step S704, the difference between the inter-picture difference $SAD_{CRR}$ in the case of applying the correction vector and the before-correction (uncorrected) inter-picture difference value is obtained, and it is determined whether the difference is less than a predetermined value or not.

After the determination step, the vector correction process is performed, which process can preliminarily prevent contradiction where the vector indicates the coordinate position with a large inter-picture difference value as a result so that image quality deterioration is made conspicuous.

If the inter-picture difference has at least the predetermined value (FALSE in step S704), the vector is not corrected, the motion vector itself is notified as coding parameters to the motion compensation unit 110, and this process is finished. This operation is thus performed because, although the motion vector with an inter-vector distance different from the distances of the other color components is detected, it is determined that the motion of the actual object can be tracked in comparison with the correction vector.

In contrast, if the inter-picture difference is not large before and after application of the correction vector $mv_{CRR}$ (TRUE in step S704), the motion vector in the coding block of the color component concerned is corrected from the value of $mv_{ORG}$ to the value of $mv_{CRR}$. The corrected motion vector is notified as the coding parameters to the motion compensation unit 110 (step S705). This correction is based on such determination that while visual image quality deterioration at the coding block level hardly occurs, it is required to prevent image quality deterioration between pictures on the picture basis by arranging the motion vector with respect to the other color components.

The before-correction inter-picture difference value in the above step is not necessarily obtained again by accessing the memory here. For instance, the inter-picture difference value that is used for vector search by the motion prediction unit on the preceding stage and is the minimum in the search window is held, which allows the value to be also used in the step concerned and enables the efficiency of the process to be improved.

Vector Correction Application Example

Subsequently, the relationship between the inter-picture difference and the motion vector in the above operation according to the present embodiment will be described with reference to FIGS. 8A and 8B.

Figure 8A:
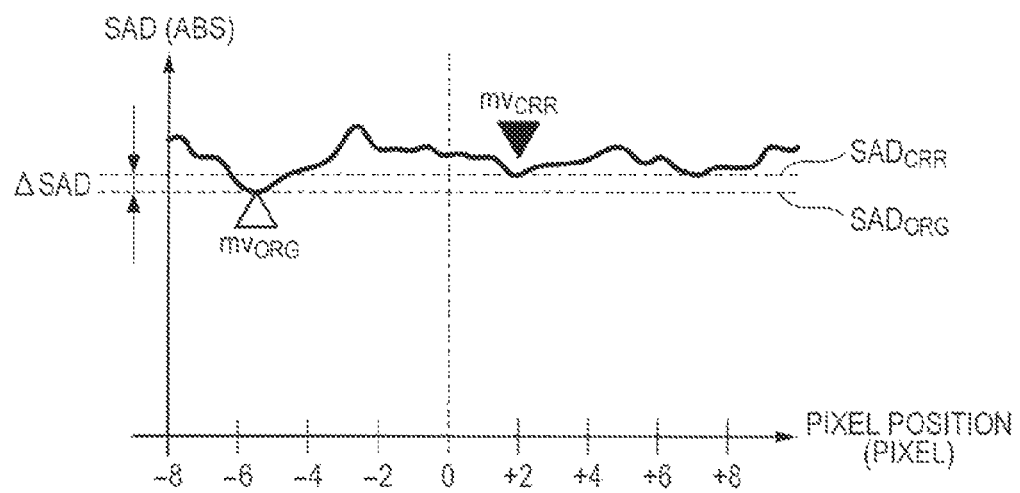
FIGS. 8A and 8B are diagrams illustrating relationship between an inter-picture difference value and the motion vector in motion vector correction according to the first embodiment of the present invention.
Figure 8B:
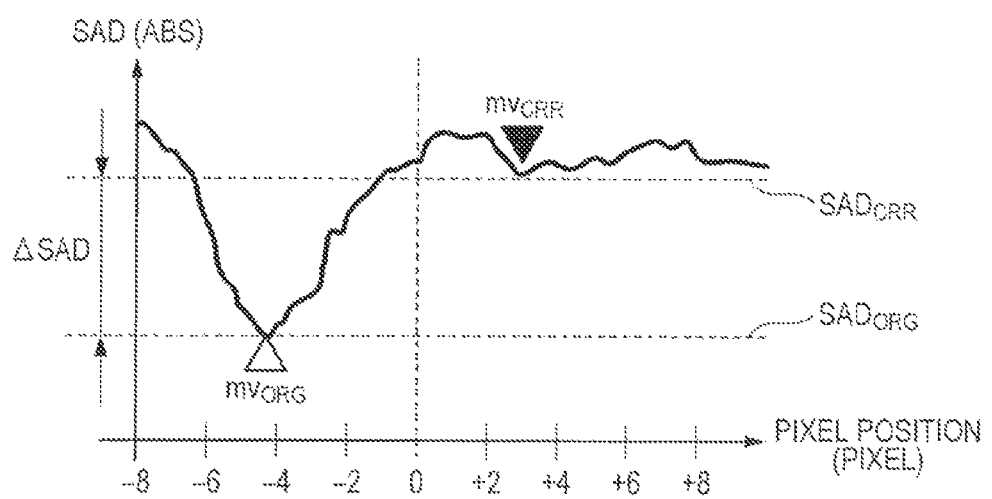

FIGS. 8A and 8B illustrate the relationship between the inter-picture difference and the vectors before and after correction in the respective cases where vector correction is performed and where vector correction is not performed.

The correcting operation obtains two vectors, i.e., the before-correction motion vector $mv_{ORG}$, and the average vector $mv_{CRR}$ of motion vectors of color signals other than that of the motion vector concerned.

FIGS. 8A and 8B illustrate the case where the minimum value $SAD_{ORG}$ of the inter-picture difference is detected around −4 to −6 pixels, and calculation is performed assuming that the vector $mv_{CRR}$ for correction has a value from +2 to +3.

In the present embodiment, before coding is performed using the correction vector as it is, the amount of variation of inter-picture difference before and after vector correction is analyzed to determine whether correction is permitted or not. More specifically, the inter-picture difference value $SAD_{CRR}$ in the case of applying the $mv_{CRR}$ is obtained and calculated, and the difference between $SAD_{ORG}$ and $SAD_{CRR}$ (corresponding to ASAD in the diagrams) is calculated. When the difference value is small (FIG. 8A), the inter-picture difference before and after vector correction is small. Accordingly, vector coding is performed using the motion vector where $mv_{ORG}$ is replaced with $mv_{CRR}$.

In contrast, when the difference value in FIG. 8B is large, it can be determined that the motion of the actual object is correctly reflected in the original motion vector $mv_{ORG}$. Accordingly, vector correction is not performed, and $mv_{ORG}$ itself is notified, as coding parameters, to the motion compensation unit 110.

Application of such determination can achieve correction to an appropriate motion vector, even though a motion vector different from the motion of an actual object is output in the case of motion prediction for each color component. Accordingly, in motion prediction coding for each color component, the image quality deterioration can be prevented.

In the first embodiment, the distance between the motion vectors for each color component is calculated, the vector with an inter-vector distance different from the distances of the other motion vectors is replaced with the average vector of the motion vectors of the other color components, thereby performing correction. However, it may be also considered to use a vector other than an average of the motion vectors of the color components other than the color component of the correction target as the correction vector. An example thereof will hereinafter be described as modifications of the first embodiment.

First Modification of the First Embodiment

This first modification corrects the motion vector of the correction target to the motion vector of another color component with a shorter inter-vector distance. This correction allows the motion vector to indicate the coordinate position with a smaller inter-picture difference in comparison with the case of using the correction vector using the average vector, thereby enabling image quality deterioration to be suppressed.

This modification will hereinafter be described with reference to drawings. In the description on this modification, the same symbols are assigned to components common to those of the first embodiment, and description thereof is appropriately omitted. In particular, the configuration of the moving image coding system is analogous to that of the first embodiment. Accordingly, description thereof is omitted.

Motion Vector Correction

Figure 9:
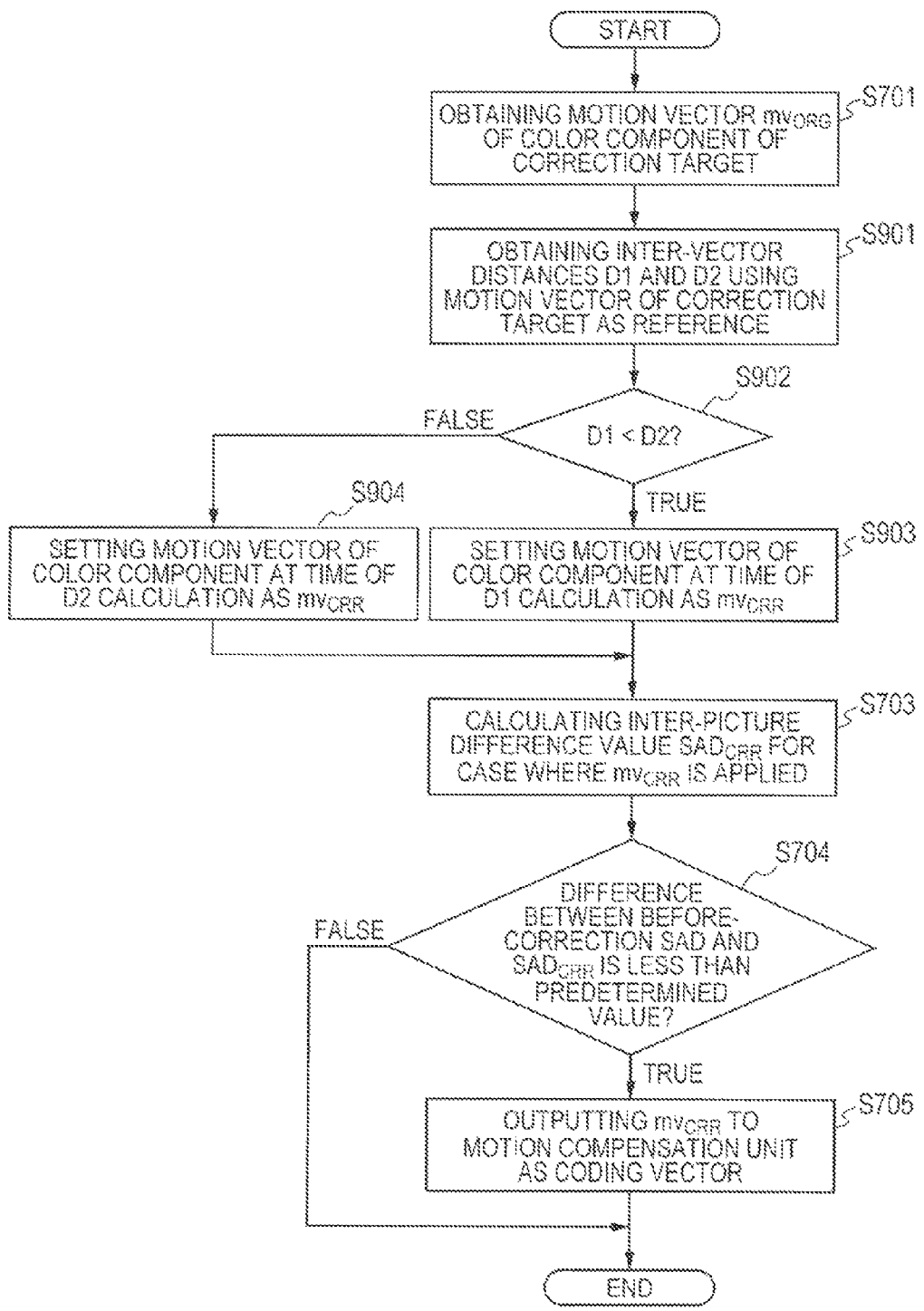
FIG. 9 is a diagram illustrating a flowchart of a motion vector correction operation according to a first modification of the first embodiment of the present invention.

A motion vector correcting operation of this modification will hereinafter be described with reference to a flowchart of FIG. 9. The obtaining of the inter-vector distance and the comparing and determining operation are analogous to those of the first embodiment.

Accordingly, the description is omitted. The correcting operation of the motion correction vector is illustrated with the same symbols assigned to steps analogous to those of the first embodiment.

The motion vector correcting operation starts at a step of obtaining the motion vector $mv_{ORG}$ of the correction target, i.e., step S701, as in the first embodiment.

Furthermore, the inter-vector distances $D_1$ and $D_2$ with reference to the motion vector other than the correction target that are obtained by the inter-vector distance obtaining operation in the first embodiment are obtained (step S901).

For instance, in the example of FIG. 6, if $mv_B$ is selected as the correction target vector, $D_{G-B}$ and $D_{B-R}$ correspond to $D_1$ and $D_2$, respectively.

Likewise, if $mv_R$ is the correction target, $D_{B-R}$ and $D_{R-G}$ correspond thereto. If $mv_G$ is the correction target, $D_{G-B}$ and $D_{R-G}$ correspond thereto.

In step S902, the inter-vector distances $D_1$ and $D_2$ are compared with each other to verify relationship in magnitude therebetween, and it is determined the motion vector of color component closer to the correction target.

If $D_1$ is smaller (TRUE in step S902), the motion vector of the color component different from the color component of the correction target among the motion vectors used for calculating $D_1$ is set as the correction vector $av_{CRR}$ (step S903).

In contrast, if $D_2$ is smaller (FALSE in step S902), the motion vector of the color component different from the color component of the correction target among the motion vectors used for calculating $D_2$ is set as the correction vector $mv_{CRR}$ (step S904).

Subsequently, as in the first embodiment, steps S703 to S705 are executed, and the motion vector correcting operation is finished.

The motion vector correcting process operation of the first modification of the first embodiment of the present invention has thus been described above.

Second Modification of First Embodiment

In the first modification, the motion vector of the color component as the correction target is corrected to the vector of the color component with the smaller inter-vector distance.

In this second modification, the motion vector of the color component as the correction target is corrected to the vector of the color component having a smaller inter-picture difference value. Accordingly, the vector is referred to that indicates the coordinate position where the contrast of the pixel value in the picture, i.e., distinction in shades is visually recognizable, in comparison with the case of applying the correction vector described in the first embodiment. In moving image coding for each color component, the image quality deterioration can thus be suppressed.

This second modification will hereinafter be described with reference to drawings.

In the description on this second modification, the same symbols are assigned to the components common to those of the first embodiment and the first modification thereof, and description thereof is appropriately omitted. In particular, the configuration of the moving image coding system is analogous to that of the first embodiment. Accordingly, the description is omitted.

Motion Vector Correction

Figure 10:
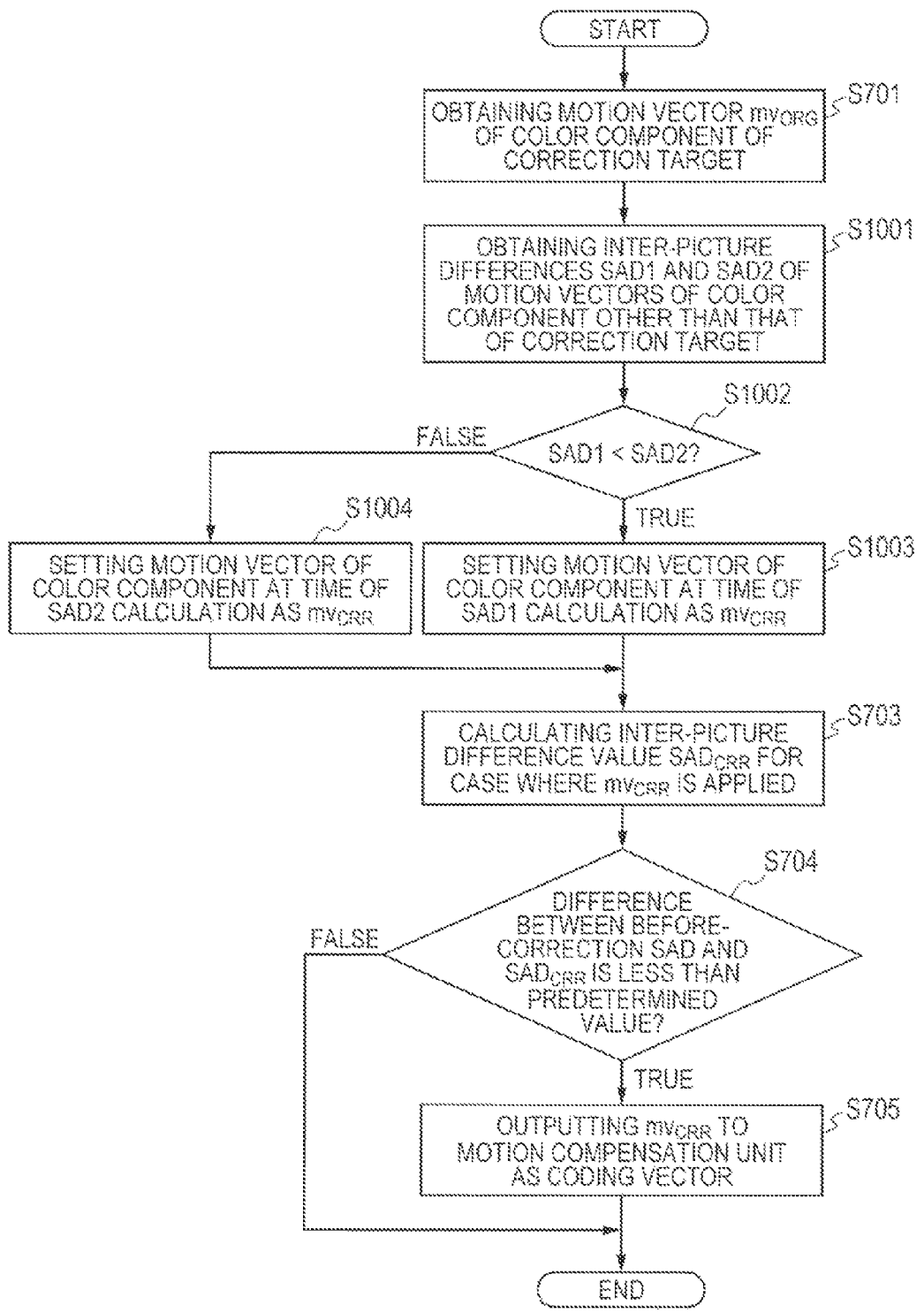
FIG. 10 is a diagram illustrating a flowchart of a motion vector correction operation according to a second modification of the first embodiment of the present invention.

A motion vector correcting operation of this second modification will be described with reference to a flowchart of FIG. 10. In this diagram, the same symbols are assigned to steps analogous to those of the first embodiment, and the description thereof is omitted here unless specifically required.

As in the first embodiment, the motion vector correcting operation of this second modification starts at the step of obtaining the motion vector $mv_{ORG}$ as the correction target, i.e., step S701.

The minimum values SAD1 and SAD2 of the inter-picture difference values calculated by the motion prediction unit for the color component other than the correction target among the motion prediction units for the color components of the moving image coding apparatus of the first embodiment are obtained (step S1001).

For instance, in FIG. 6, if $mv_B$ is selected as the correction target vector, SAD1 and SAD2 correspond to the inter-picture difference value when the vector coordinate of $mv_G$ is determined and the inter-picture difference value when the vector coordinate of $mv_R$ is determined, respectively.

In step S1002, SAD1 and SAD2 are compared with each other to verify relationship in magnitude therebetween, and it is determined which color component of motion vector has a smaller inter-picture difference value, i.e., whether the motion between the original image and the reference image can be clearly detected.

If the inter-picture difference value SAD1 is smaller (TRUE in step S1002), the motion vector of the color component at the time of SAD1 calculation is set to the correction vector $mv_{CRR}$ (step S1003).

In contrast, if the inter-picture difference value SAD2 is smaller (FALSE in step S1002), the motion vector of the color component at the time of SAD2 calculation is notified and output as the correction vector $mv_{CRR}$ (coding parameters) to the motion compensation unit 110 (step S1004).

Subsequently, as in the first embodiment, steps S703 to S705 are executed, and the motion vector correcting operation is finished.

The motion vector correcting operation of the second modification of the first embodiment of the present invention has thus been described above.

Second Embodiment

Next, a second embodiment of the present invention will be described with reference to drawings.

The present embodiment has a configuration that sets any of the motion vectors of the color components is set as a reference vector in which the motion of the image is considered to be most suitably reflected, and the motion vectors of the other color components are corrected to the reference vector. As in the first embodiment, a moving image coding apparatus according to the present embodiment is achieved by a moving image coding system where the present invention is applied to the image pickup apparatus, such as a video camera. The configuration is analogous to that of the first embodiment. Accordingly, the description thereof is omitted here.

As in the first embodiment, the moving image coding apparatus according to the present embodiment may also be provided as an apparatus which includes the components of the moving image coding system but from which the image pickup unit 101 and the color component separation unit 102 are excluded and which can be executed by a computer. For instance, this apparatus may be provided as a moving image coding apparatus or method executed by an information processing apparatus, such as a PC, according to a program or partial combination with hardware. Also in the present embodiment of the present invention, for the sake of description, input of an image of RGB three primary colors is assumed, and the first color component is the R component, the second color component is the G component, and the third color component is the B component. However, this configuration is not limited thereto in the present invention.

Reference Vector Determination Process

Figure 11:
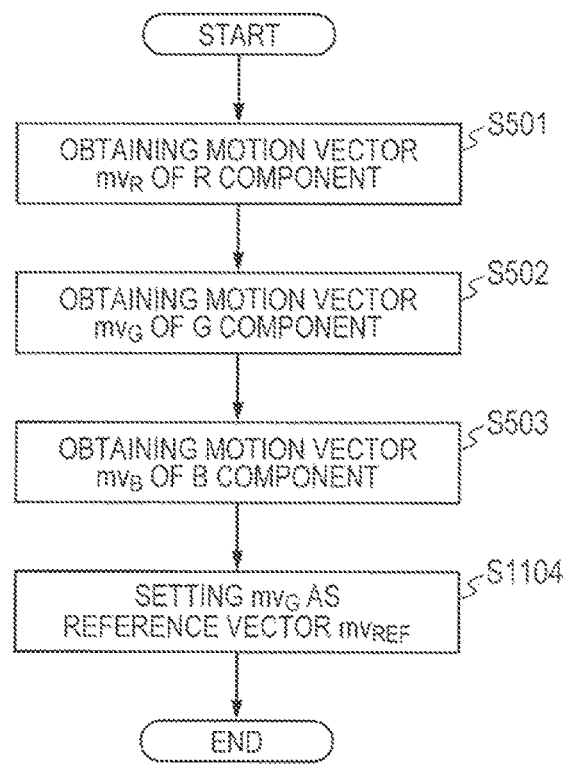
FIG. 11 is a diagram illustrating a flowchart of a motion vector correction operation according to a second embodiment of the present invention.

A reference vector determining operation of the moving image coding apparatus according to the present embodiment will be described with reference to FIG. 11.

This operation is executed by the inter-vector distance obtaining unit 117 of the moving image coding apparatus according to the first embodiment.

First, in step S501, the motion vector $mv_R$ of the R component obtained by the motion vector prediction unit 114 of the first color component is obtained. Likewise, the motion vector $mv_G$ of the G component is obtained from the motion vector prediction unit 115 for the second color component (step S502), and the motion vector $mv_B$ of the B component is obtained from the motion vector prediction unit 116 for the third color component (step S503).

In the present embodiment, the luminance component is most visually recognizable according to human visual characteristics among the three color signals. Accordingly, the motion vector $mv_G$ of the G component including the largest amount of luminance component is set as the reference vector $mv_{REF}$ (step S1104).

The determining operation of the reference vector has thus been described above.

Inter-Vector Distance Comparison and Motion Vector Correction

Next, inter-vector distance comparison and a motion vector correcting operation of the present embodiment will be described with reference to FIGS. 12 and 13.

This operation is executed by the inter-vector distance comparison unit 118 and the motion vector correction unit 119 of the moving image coding apparatus.

First, in step S1301, the reference vector $mv_{REF}$ obtained by the reference vector determining operation, and the motion vector $mv_2$ of the first color component other than the color component of the reference vector are obtained, and the inter-vector distance $D_1$ between the two motion vectors is calculated based on the Expression (2).

Likewise, in step S1302, the reference vector $mv_{REF}$, and the motion vector $mv_2$ of the second color component other than the color components of the reference vector and the $mv_2$ vector are obtained, the inter-vector distance $D_2$ between the two motion vectors is calculated based on the Expression (2).

Figure 13:
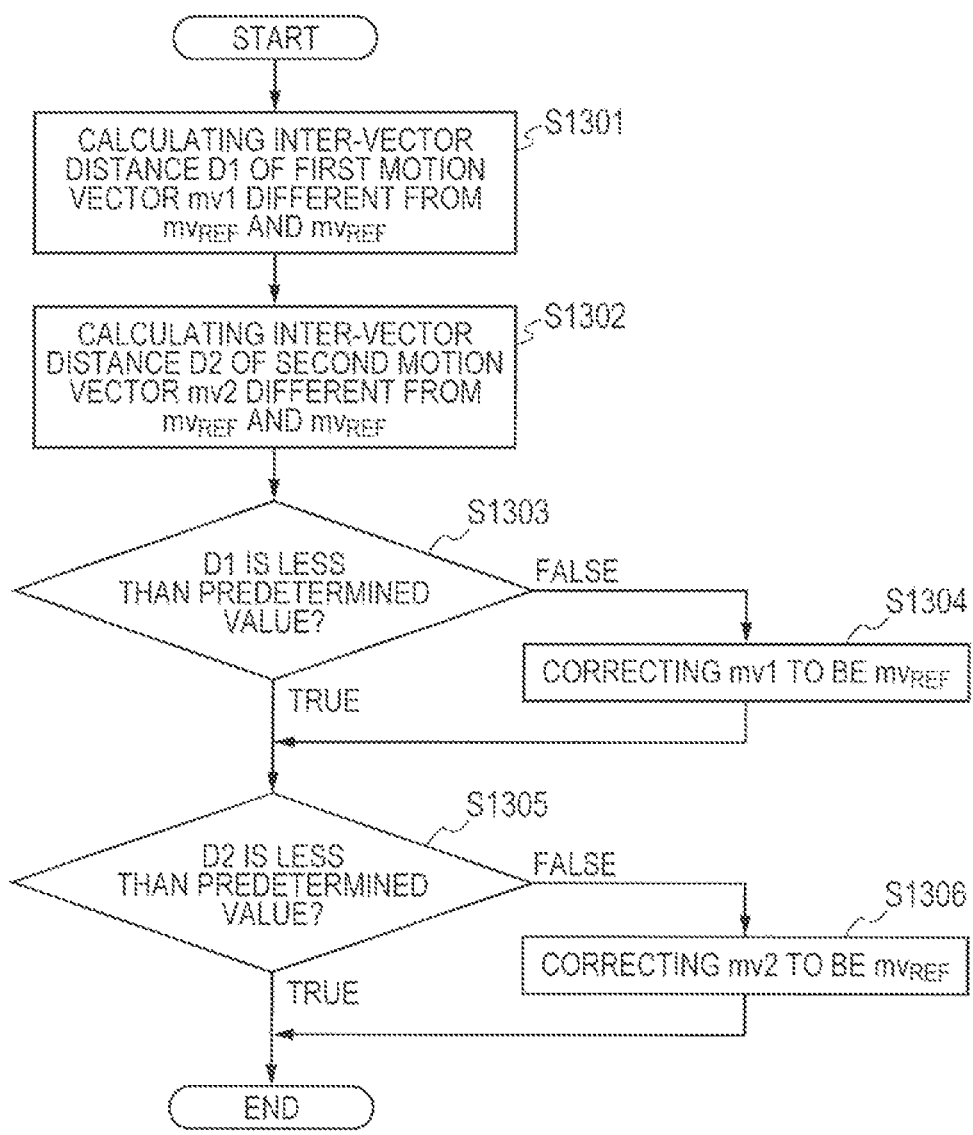
FIG. 13 is a diagram illustrating a flowchart of a motion vector correction operation according to the second embodiment of the present invention.

Thus, as illustrated in the example of FIG. 13, the scalar D representing the distance between the apices of the two color component motion vectors is obtained, and the correlation relationship of after-mentioned vectors is determined.

Figure 12:
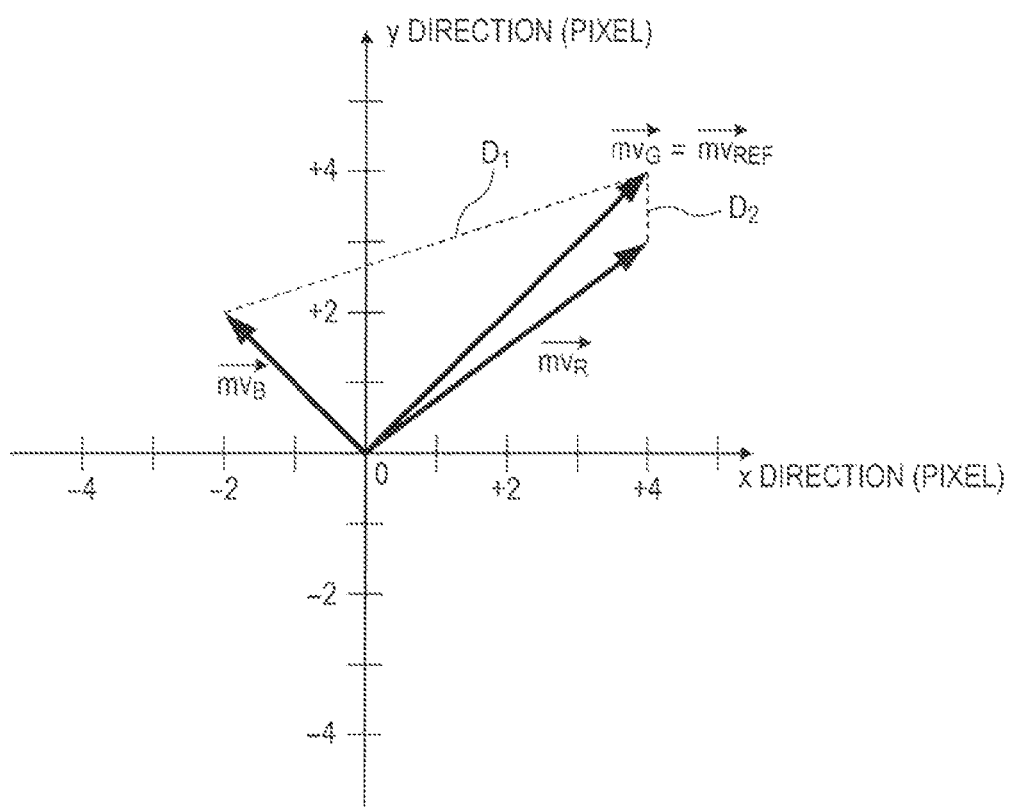
FIG. 12 is a diagram for illustrating motion vector correction according to the second embodiment of the present invention.

In the example of FIG. 12, the motion vectors of the color components are $mv_R=(4, 3)$, $mv_G=(4, 4)$ and $mv_B=(-2, 2)$. The reference vector determining operation sets the motion vector $mv_G$ of the G component as the $mv_{REF}$.

Thus, the inter-vector distance $D_1$ between the G component and the B component, and the inter-vector distance $D_2$ between the G component and the R component can be calculated as follows.

$$D_1=\sqrt{29},\ D_2=1$$

Based on the calculation result, in step S1303, the inter-vector distance $D_1$ representing the amount of deviation of the motion vector of the first color component from the reference vector is compared with a predetermined value to determine whether the distance is less than the predetermined value or not. In FIG. 12, $D_1$ corresponds to the distance between the apices of the motion vectors of the B component with respect to the G component.

In general, if the inter-vector distance is less than a few pixels (TRUE in step S1303), the reference vector $mv_{REF}$ and $mv_I$ have the substantially identical vector directions and lengths. Accordingly, it is determined that a problem, such as out-of-color registration, hardly occurs visually. The predetermined value set as a threshold by the comparison and determination step is set according to such a determination.

As a result, the motion vector $mv_2$ is not corrected but is output as it is as coding parameters to the motion compensation unit 110, and the reference image is generated and vector coding is performed.

In contrast, if the inter-vector distance $D_1$ has a value at least the predetermined value (FALSE in step S1303), the motion vector $mv_2$ of the color component concerned is corrected to the same vector as the reference vector $mv_{REF}$ and this vector is output (step S1304).

Likewise, in step S1305, the inter-vector distance $D_2$ representing the amount of deviation of the motion vector of the second color component with respect to the reference vector is compared with the predetermined value to determine whether the distance is less than the predetermined value or not. In FIG. 12, $D_2$ corresponds to the distance between apices of the motion vectors of the R component with respect to the G component.

If $D_2$ is less than the predetermined value (TRUE in step S1305), the reference vectors $mv_{REF}$ and $mv_2$ have the substantially identical vector directions and lengths. Accordingly, $mv_2$ is not corrected but is output, as it is, to the motion compensation unit 110, and the reference image is generated and vector coding is performed.

In contrast, if the inter-vector distance $D_2$ has a value at least the predetermined value (FALSE in step S1305), the motion vector $mv_2$ of the color component concerned is corrected identically to the reference vector $mv_{REF}$, and this vector is output (step S1306).

The inter-vector distance comparison and the vector correcting operation of the present embodiment have thus been described.

According to the second embodiment of the present invention, in the case where the motion prediction is performed for each color component, even if the motion vector different from the motion of the actual object is output, correction can be performed to an appropriate motion vector. Thus, image quality deterioration can be prevented.

In the second embodiment, the motion vector of the G component among the motion vectors of the color components is selected as the reference vector, and the motion vector having an inter-vector distance from the reference vector that is at least predetermined value is corrected.

Next, other examples of the configuration of setting the reference vector are described as first and second modifications of the second embodiment. Also in this modification, the configuration of the moving image coding system is analogous to that of the first embodiment.

Accordingly, the description is omitted here.

First Modification of Second Embodiment

The first modification of the second embodiment determines the reference vector according to a photographing mode designated by a user at the time of a recording operation. Thus, the motion vector of the color component suitable to photographing parameters, such as hue and brightness, differing according to the photographing mode is prioritized, and the image quality deterioration can be suppressed.

Reference Vector Determination

Figure 14:
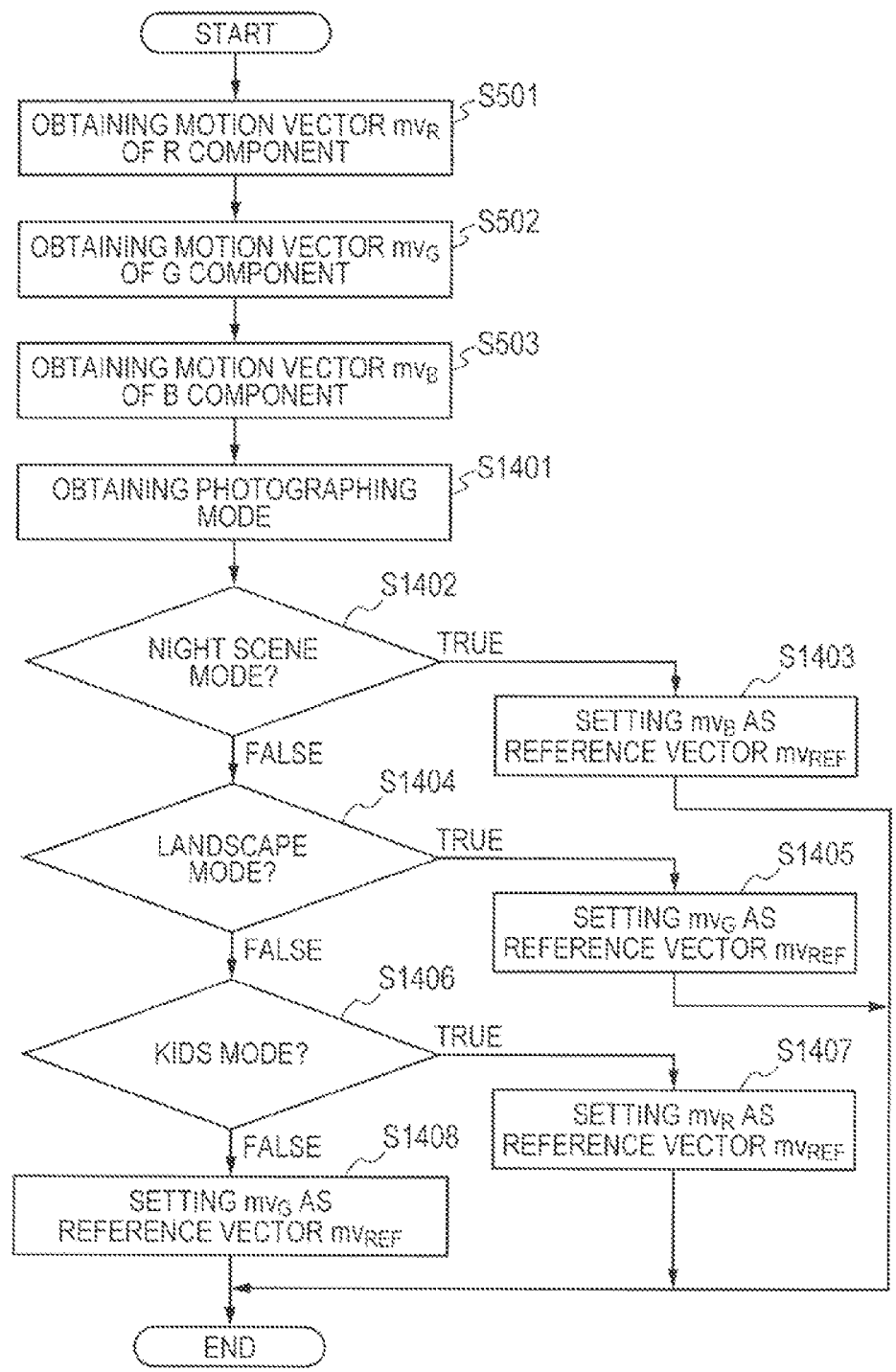
FIG. 14 is a diagram illustrating a flowchart of a motion vector correction operation according to a first modification of the second embodiment of the present invention.
Figure 15:
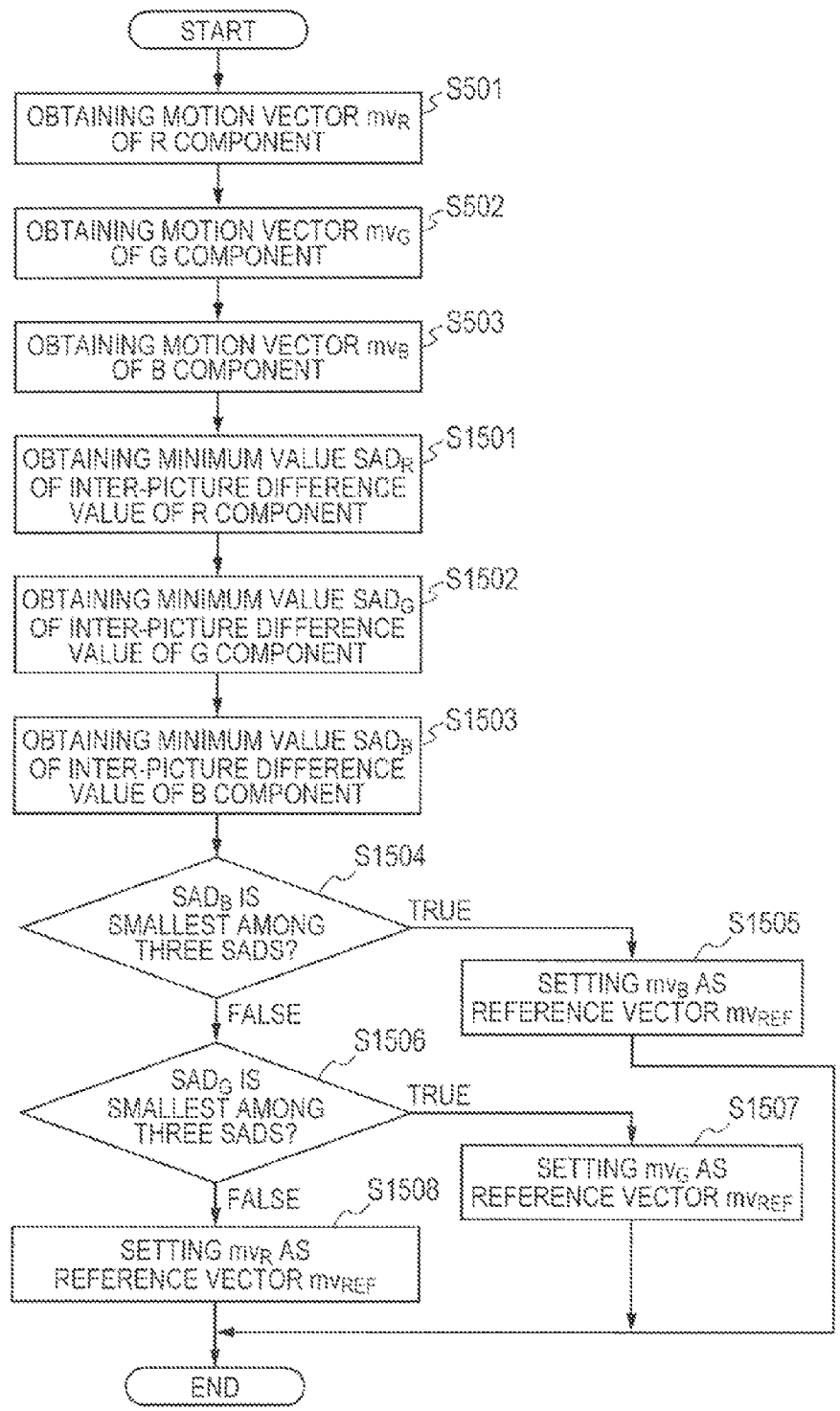
FIG. 15 is a diagram illustrating a flowchart of a motion vector correction operation according to a second modification of the second embodiment of the present invention.
Figure 17:
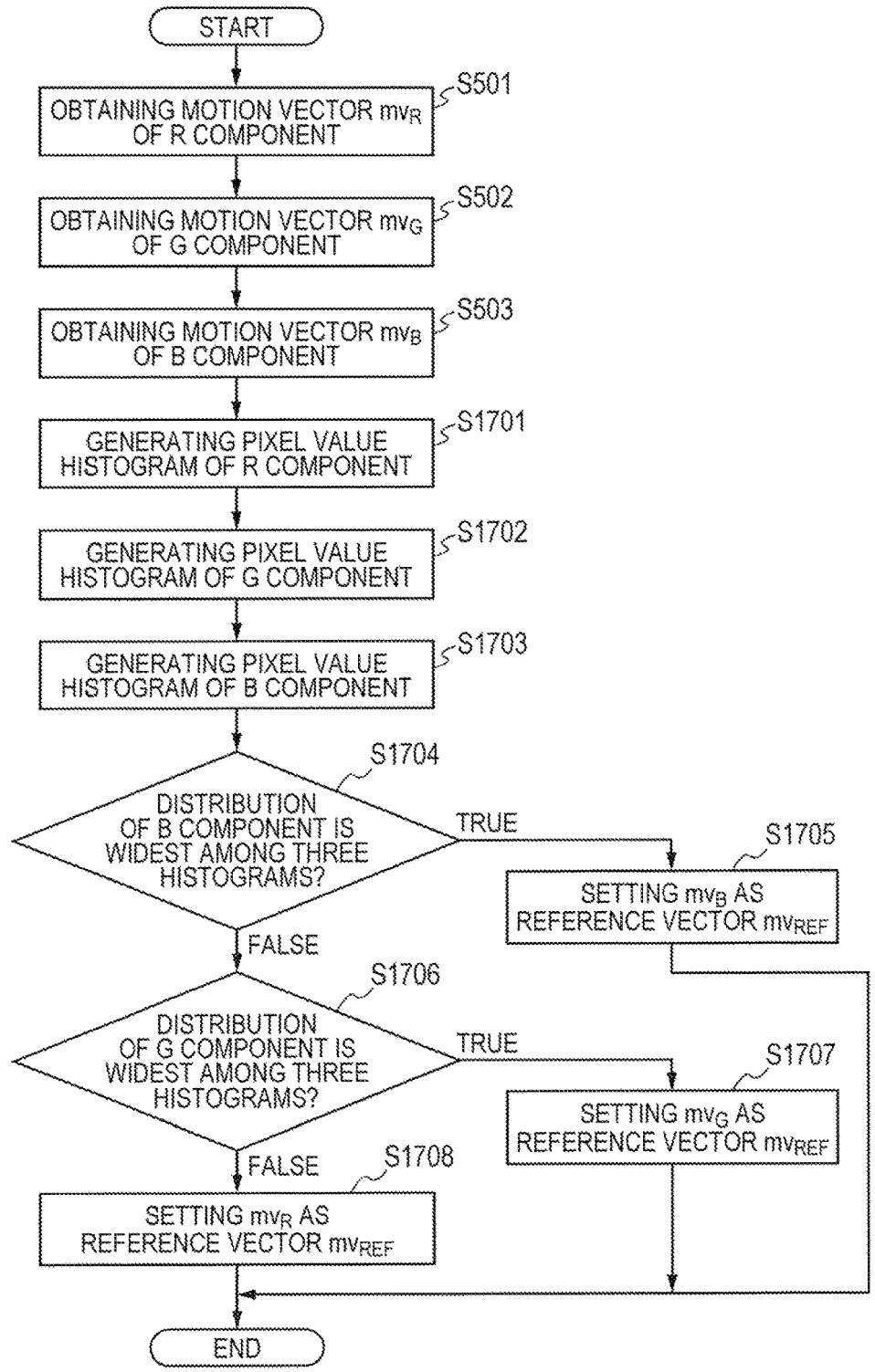
FIG. 17 is a diagram illustrating a flowchart of a motion vector correction operation according to a third modification of the second embodiment of the present invention.

A reference vector determining operation of this first modification will hereinafter be described with reference to a flowchart of FIG. 14. The same symbols are assigned to the components common to those of the second embodiment, and description thereof is appropriately omitted.

As with the second embodiment, the reference vector determining operation starts at steps of obtaining the motion vectors $mv_R$, $mv_G$ and $mv_B$ of the three color components, or R, G and B, i.e., steps S501 to S503.

A user-set photographing mode input through user interfaces, such as operation buttons and a touch panel, not illustrated in FIG. 1, is obtained from the control unit, such as the CPU of the moving image coding apparatus (step S1401).

Next, in step S1402 and thereafter, the type of the photographing mode is determined, the process of setting the motion vector of the optimal color component to the reference vector is sequentially executed at the time of coding the moving image input at the mode.

In step S1402, it is determined whether the photographing mode is set to a night scene mode or not. The night scene mode is a photographing mode where various photographing parameters are automatically set for appropriately photographing a night landscape as an object. In the case of a dark image, such as of a night landscape (TRUE in step S1402), a blue hue is a factor determining the image quality more than green and red hues. Accordingly, $mv_B$ prioritizing the B component is set as the motion vector $mv_{REF}$ to be a reference (step S1403).

Subsequently, if the mode is not the night scene mode (FALSE in step S1402), it is determined whether the photographing mode is set to a landscape mode or not (step S1404). The landscape mode is a photographing mode where various photographing parameters are automatically set for appropriately photographing a landscape as an object.

If the landscape mode is set (TRUE in step S1404), images of objects including the G component, such as mountains and trees, more than people and moving objects are often taken. Accordingly, if the photographing mode is designated as the landscape mode, the motion vector $mv_G$ of the G component is set to the reference vector $mv_{REF}$ (step S1405).

If the setting mode is not set to the night scene mode or the landscape mode (FALSE in step S1404), it is determined whether a mode for photographing objects mainly of a person, such as a kids mode or a portrait mode, is set or not (step S1406). In the kids mode and the portrait mode, various photographing parameters are automatically set for appropriately photographing objects, i.e., a moving person and a stationary person, respectively.

If determination is TRUE in step S1406 and the mode for photographing a person is set, a hue and material feeling of skin color are factors determining the image quality. Accordingly, the vector $mv_R$ of the R component is set to reference vector $mv_{REF}$ (step S1407).

Finally, if the mode is not any of the photographing modes (FALSE in step S1406), the reference vector determination process of the second embodiment sets the motion vector $mv_G$ of the G component to the reference vector $mv_{REF}$, and this flow is finished.

Subsequently, according to a flowchart of FIG. 13, the motion vector correction for other color components is performed using the set reference vector.

The reference vector determining operation according to the first modification of the second embodiment of the present invention has thus been described.

Second Modification of Second Embodiment

The first modification of the second embodiment determines the reference vector according to the photographing mode designated by the user at the time of the recording operation. In this second modification, the motion vector having the minimum inter-picture difference value among the motion vectors of the three color components is set as the reference vector. Accordingly, the motion vector of the color component following the motion of the object at the highest fidelity is determined. The accuracy of the vector correction process with reference to the motion vector is improved, and the image quality deterioration can be suppressed.

Reference Vector Determination

A reference vector determining operation of this second modification will be described with reference to FIGS. 15 and 16A to 16C. In this second modification, the same symbols are assigned to the components common to those of the second embodiment and the first modification thereof, and description thereof is appropriately omitted.

As with the second embodiment, this reference vector determining operation starts at steps of obtaining the motion vectors $mv_R$, $mv_G$ and $mv_B$ of the three color components, or R, G and B, i.e., steps S501 to S503.

The inter-picture difference values (minimum values) for generating the motion vectors in the first to third motion vector prediction units 114, 115 and 116 are obtained on the respective color components (steps S1501, S1502 and S1503).

FIGS. 16A, 16B and 16C exemplify the inter-picture difference values of the respective color components, in the search window in the cases where the motion vectors $mv_R$, $mv_G$ and $mv_B$ are determined.

According to the examples in the diagrams, the minimum value of the inter-picture difference value at the time of determining $mv_R$ is defined as $SAD_R$, the minimum value of the inter-picture difference value at the time of determining $mv_G$ is defined as $SAD_G$, and the minimum value of the inter-picture difference value at the time of determining $mv_B$ is defined as $SAD_B$.

In step S1504 and thereafter, operations are sequentially performed that search for the color component having the smallest value among the minimum values of the inter-picture difference values of the three color components obtained by the above processing steps and then set the motion vector of the color component concerned as the reference vector.

In step S1504, it is determined whether the color component having the smallest value among the minimum values of the three inter-picture difference values is the B component or not.

If the inter-picture difference value $SAD_B$ of the B component is the smallest (TRUE in step S1504), the motion vector $mv_B$ of the B component is set as the reference vector $mv_{REF}$ (step S1505).

In contrast, a value other than the inter-picture difference value $SAD_B$ of the B component has a small value (FALSE in step S1504), it is determined whether the minimum value of the inter-picture difference value of the G component is the smallest or not (step S1506).

If the inter-picture difference value $SAD_G$ of the G component is the smallest (TRUE in step S1506), the motion vector $mv_G$ of the G component is set as the reference vector $mv_{REF}$ (step S1507).

Finally, if the color component having the smallest value among the minimum values of the three inter-picture difference values is not the B component or the G component (FALSE in step S1506), it is determined that the inter-picture difference value $SAD_R$ of the R component is the smallest. Accordingly, the motion vector $mv_R$ of the R component is set to the reference vector $mv_{REF}$ (step S1508).

The reference vector determining operation of the second modification of the second embodiment of the present invention has thus been described above. Subsequently, according to the flowchart of FIG. 13, the motion vector correction on the other color components is performed using the set reference vector.

In the determining operation, the comparison and determination are performed in an order of the B component, the G component and the R component. However, any order of determining the color components may be adopted in terms of implementing the present invention. The operation is not limited only if the operation compares all the color components.

In the examples of FIGS. 16A to 16C, if the reference vector is determined according to the above determining operation, the motion vector $mv_B$ of the B component (−2, 2) having $SAD_B$ that is the smallest SAD value is selected as the reference vector.

Third Modification of Second Embodiment

A second modification of the second embodiment sets the vector having the smallest inter-picture difference value among the motion vectors of the three color components as the reference vector.

In this third modification, the frequency (histogram) of the pixel value is obtained, in a picture or for each image region, on the input image of three color component. The reference vector is determined and set according to the variation in the pixel value distribution. This configuration determines the reference vector based on characteristics where the color component having a wider pixel value distribution in the picture, i.e., a wider range of shades, can easily calculate a vector in which the motion of the object is more correctly reflected. This configuration can suppress the image quality deterioration.

Reference Vector Determination Process

A third modification of the second embodiment will hereinafter be described with reference to FIGS. 17 and 18A to 18C.

In the description of this third modification, the same symbols are assigned to the components common to those of the first and second modifications of the second embodiment, and description thereof is appropriately omitted. As in the second embodiment, the reference vector determining operation starts at steps of obtaining the motion vectors $mv_R$, $mv_G$ and $mv_B$ of the three color components, or R, G and B, i.e., steps S501 to S503.

Pixel histograms are generated on all the three respective color components (steps S1701, S1702 and S1703).

FIGS. 18A to 18C illustrates examples of the histograms of the respective color components. The abscissa of the histogram represents a range of possible pixel values. Generally, in the case of representing the pixel value of one pixel in 8 bits, the values are integers from 0 to 255. The ordinate represents the number of frequency of the color component on a frame-to-frame basis, a search window basis, or the coding block basis for the pixel values.

This variation does not specifically limit the size of a unit of image data on which histogram calculation is performed. However, for achieving both fine control in a picture and data reliability depending on the number of samples, search window basis is desirable.

Next, in step S1704 and thereafter, processes are sequentially executed which processes search for the color component with the largest variation in pixel value among the histograms of the three color components generated by the processing steps, and set the motion vector of the color component concerned to the reference vector.

In this modification, measures for obtaining variation in pixel value for each color component obtain standard dispersion $\sigma^2$ used for general distribution evaluation, based on the following Expression (4), and the magnitudes of the dispersion values are compared between the color components.

$$\sigma^2 = \frac{1}{n}\sum_{i=0}^{n}(x_i - X)^2 \qquad \text{Expression (4)}$$

Here, $x_i$ is the frequency of each pixel value, and X is the arithmetic average value obtained by the following Expression (5). n is the maximum value of the pixel value, i.e., 255, and i is any of integers from 0 to 255.

$$X = \frac{1}{n}\sum_{i=0}^{n} x_i \qquad \text{Expression (5)}$$

It is represented that, the larger the dispersion value obtained based on the above expression is, the wider the distribution variation is. Pixels are represented to reside in a range from 0 to 255.

In step S1704, it is determined whether the color component having the largest variation of the histogram among the three histograms is the B component or not.

If the histogram of the B component is the widest (TRUE in step S1704), the motion vector $mv_B$ of the B component is set as the reference vector $mv_{REF}$ (step S1705).

In contrast, a histogram distribution other than the B component has a large value (FALSE in step S1704), it is determined whether the histogram distribution value of the G component is the largest or not (step S1706).

If the histogram distribution of the G component is the widest (TRUE in step S1706), the motion vector $mv_G$ of the G component is set as the reference vector $mv_{REF}$ (step S1707).

Finally, if the color component having the largest value among the three histogram distributions is not the B component or the G component (FALSE in step S1706), the histogram distribution of the R component is determined to be the widest. Accordingly, the motion vector $mv_R$ of the R component is set as the reference vector $mv_{REF}$ (step S1708).

The operation of determining the reference vector of the third modification of the second embodiment of the present invention has thus been described. The motion vector correction after setting the reference vector is performed according to the flowchart of FIG. 13, as with the second embodiment.

In the above determination flow, the comparison and determination are performed in an order of the B component, the G component and the R component. However, any order of determining the color components may be adopted in terms of implementing this modification. The flow is not limited only if the flow compares all the color components.

In the examples of FIGS. 18A to 18C, in the case of determining the reference vector according to the determining operation, the color component having the widest histogram distribution is the R component. Accordingly, the motion vector $mv_R$ of the R component is selected as the reference vector.

Third Embodiment

In the first embodiment, the inter-vector distances of the motion vectors of the color components are calculated, the distances are compared with each other to detect the color component with inter-vector distance different from that of the other color component. The motion vector of the color component concerned is corrected to the average vector of the motion vectors of the other color components, the motion vector of the color component with the minimum inter-vector distance, or the motion vector of the color component with the minimum inter-picture difference value. In the second embodiment, one of the motion vectors of the color components is determined as the reference vector, and the color component to be the correction target is determined according to the distance between the determined motion vector and the other motion vector.

In the third embodiment, the reference image numbers of the respective color components are compared with each other, and, if there is a color component having a reference image number different from that of the other color component, the reference image number concerned is corrected to an appropriate reference image number, and the corresponding motion vector is also corrected. Accordingly, correction at a high accuracy including the time direction in addition to the magnitude of the two-dimensional vector value can be performed, and image quality deterioration can be suppressed.

The third embodiment of the present invention will hereinafter be described with reference to drawings. In the description of the third embodiment, the same symbols are assigned to the components common to those of the first and second embodiments, and description thereof is appropriately omitted.

System Configuration

Figure 19:
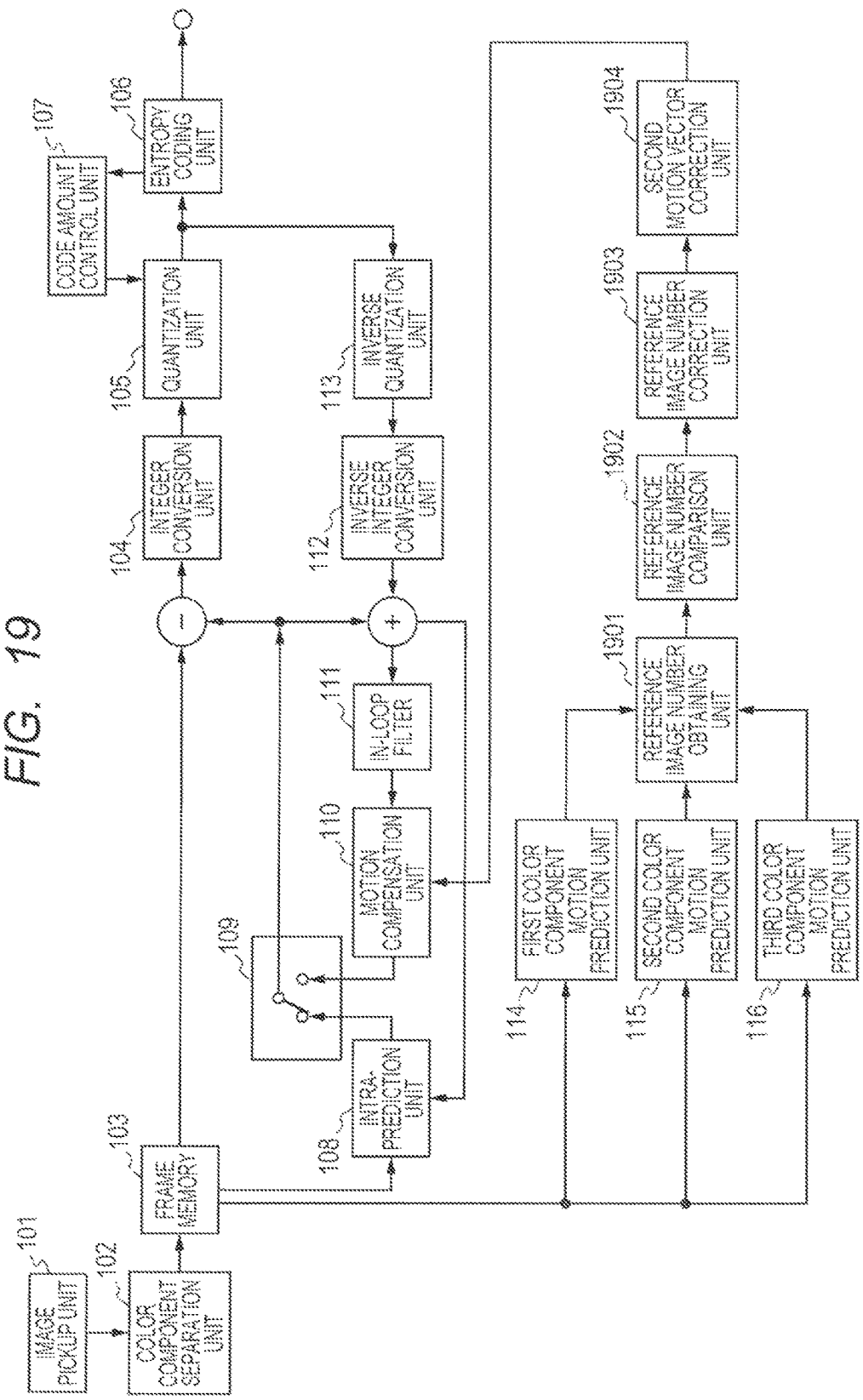
FIG. 19 is a block diagram of a coding system including a moving image coding apparatus according to the third embodiment of the present invention.

FIG. 19 is a block diagram illustrating a configuration of a moving image coding system where the moving image coding apparatus according to the third embodiment of the present invention is applied to the image pickup apparatus, such as a video camera.

As in the first embodiment, the moving image coding apparatus according to the present embodiment may also be provided as an apparatus which includes the components of the moving image coding system but from which the image pickup unit 101 and the color component separation unit 102 are excluded and which can be executed by a computer. For instance, this apparatus may be provided as a moving image coding apparatus or method executed by an information processing apparatus, such as a PC, according to a program or partial combination with hardware.

Also in the present embodiment of the present invention, for the sake of description, input of an image of RGB three primary colors is assumed, and the first color component is the R component, the second color component is the G component, and the third color component is the B component. However, this configuration is not limited thereto in the present invention.

The system of the present embodiment includes: the configurational elements 101 to 116, which are the configurational elements of the first embodiment; and configurational elements that are a reference image number obtaining unit 1901, a reference image number comparison unit 1902, a reference image number correction unit 1903, and a second motion vector correction unit 1904.

The motion compensation unit 110 generates the reference image data, which is to be used for inter-coding, through use of the prediction image data filter-processed by the in-loop filter 111, the motion vector notified from the after-mentioned second motion vector correction unit 1904, and the reference image number. The generated reference image data is stored in the frame memory 103.

The reference image number obtaining unit 1901 obtains the reference image numbers of the respective color components at the same position in the coding block that are obtained by the motion prediction units 114, 115 and 116 of the first to third color components. The present embodiment adopts a syntax value called ref_idx for coding on a coding block basis defined by MPEG-4AVC/H.264 standards as information representing the reference image number. However, the information is not specifically limited only if the value identical to the information can be obtained.

The ref_idx value is described, in coded data, as information for uniquely identifying the image position to be referred to by the coding block, and used for decoding. Even in the case of performing the coding independently for each color component, the same ref_idx value is described for the images temporally at the same position.

The reference image number comparison unit 1902 compares pieces of temporal position information (ref_idx) of the reference images of the respective color components notified from the reference image number obtaining unit 1901 with each other, and determines whether the specific color component ref_idx is different or not.

The reference image number correction unit 1903 corrects the reference image number of the color component concerned to an appropriate reference image number, based on the determination result by the reference image number comparison unit 1902.

The second motion vector correction unit 1904 corrects the motion vector according to proportional arithmetic, based on the reference distances of the reference images represented by the reference image numbers set by the reference image number correction unit before and after correction. The corrected reference image number and the motion vector are output as coding parameters to the motion compensation unit 110, and used for generating the prediction image therein.

The configuration of the moving image coding system of the third embodiment of the present invention has thus been described above.

Reference Image Number Comparison

Figure 20:
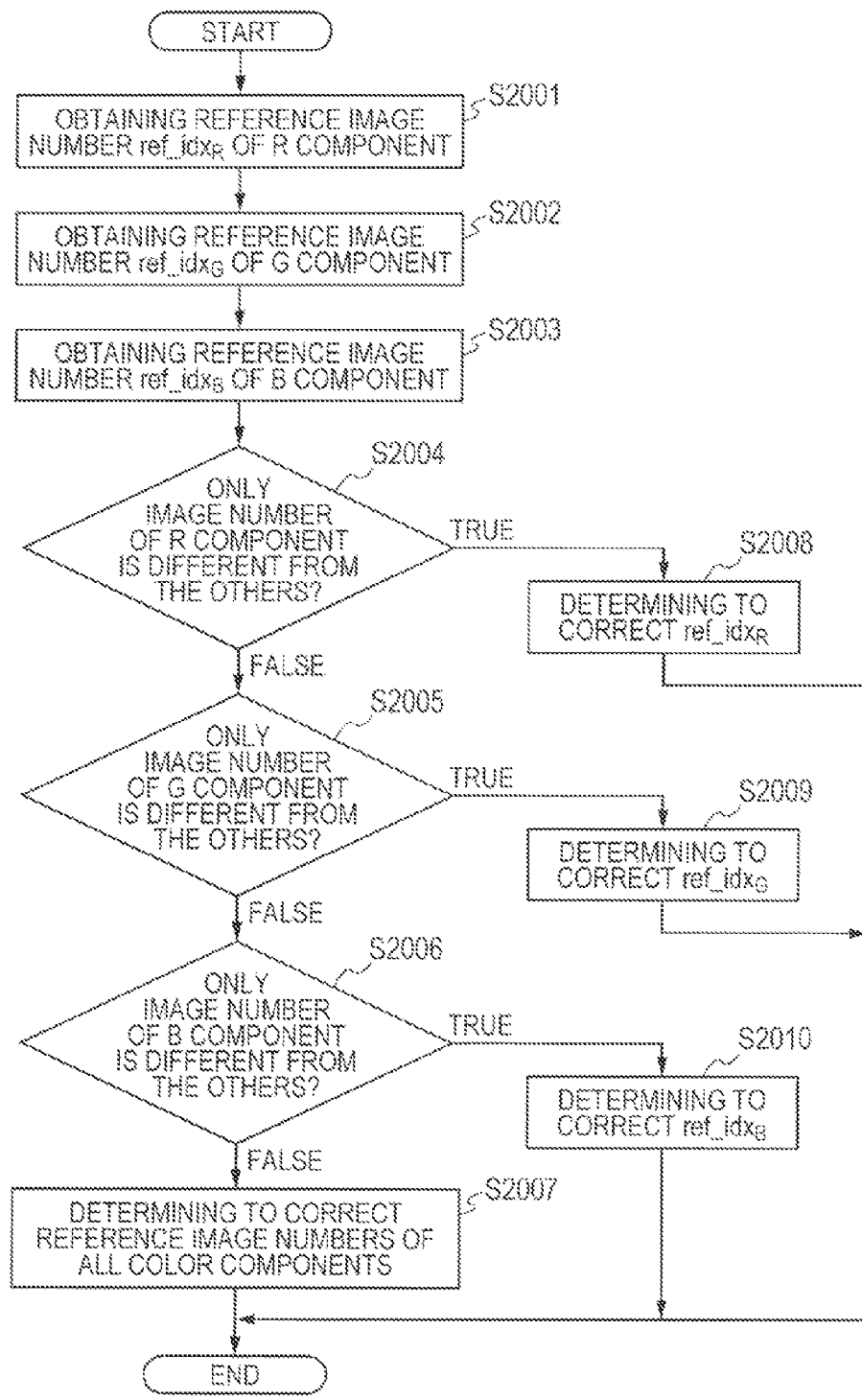
FIG. 20 is a diagram illustrating a flowchart of an operation of correcting a reference image number in the moving image coding apparatus according to the third embodiment of the present invention.

A reference image number comparing operation of the third embodiment of the present invention will hereinafter be described with reference to a flowchart of FIG. 20. This operation is executed by the reference image number obtaining unit 1901 and the reference image number comparison unit 1902 of the moving image coding system according to the present embodiment.

First, in step S2001, the reference image number ref_idx$_R$ of the R component obtained by the motion prediction process is obtained from the first motion prediction unit 114. Likewise, the reference image number ref_idx$_G$ of the G component is obtained from the second motion prediction unit 115 (step S2002), and the reference image number ref_idx$_B$ of the B component is obtained from the third motion prediction unit 116 (step S2003).

Subsequently, the reference image numbers of the three color components obtained in steps S2001 to S2003 are compared with each other to determine the reference image number of the color component that is to be corrected.

In step S2004, it is compared and determined whether only the R component has the reference image number different from that of the other color components or not. As a result of the comparison and determination, if only the R component has a different number (TRUE in step S2004), it is determined that the reference image number ref_idx$_R$ value of the R component is to be corrected and coded. This determination is notified to the reference image number correcting process unit of the subsequent stage, and then this flow is finished (step S2008).

In contrast, if the reference image numbers of components other than the R component are different (FALSE in step S2004), it is compared and determined whether only the G component has the reference image number different from that of the other color components or not (step S2005). As a result of the comparison and determination, if only the G component has a different number (TRUE in step S2005), it is determined that the reference image number ref_idx$_G$ value of the G component is to be corrected and coded. This determination is notified to the reference image number correcting process unit of the subsequent stage, and then this flow is finished (step S2009).

Instead, the reference image numbers of components other than the G component are different (FALSE in step S2005), it is compared and determined whether only the B component has the reference image number different from that of the other color components or not (step S2006). As a result, if only the B component has a different number (TRUE in step S2006), it is determined that the reference image number ref_idx$_B$ value of the B component is to be corrected and coded. This result of determination is notified to the reference image number correcting process unit of the subsequent stage, and then this flow is finished (step S2010).

Finally, if the reference image numbers of all the color components are different (FALSE in step S2006), it is determined that the reference image number of all the color components are to be corrected and coded, and this operation is finished (step S2007).

The reference image number comparing operation of the third embodiment of the present invention has thus been described.

Reference Image Number Correction

Figure 21:
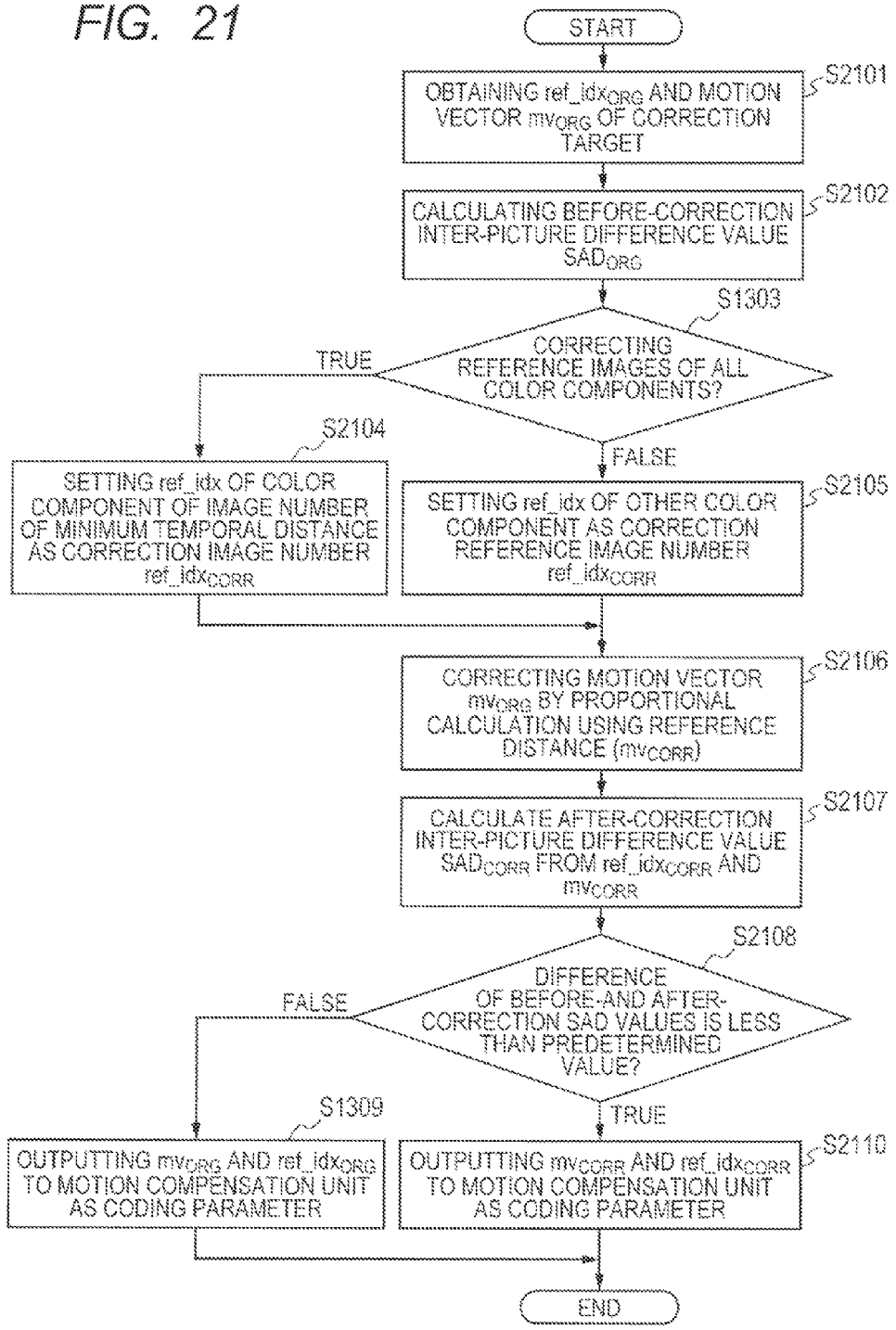
FIG. 21 is a diagram illustrating a flowchart of an operation of correcting a reference image number in the moving image coding apparatus according to the third embodiment of the present invention.

Next, the reference image number correcting operation of the third embodiment of the present invention will be described with reference to a flowchart of FIG. 21.

This operation is executed by the reference image number correction unit 1903 and the second motion vector correction unit 1904 of the moving image coding system of the present embodiment.

First, in step S2101 of the reference image number comparing operation, the reference image number ref_idx$_{ORG}$ on the color component as the correction target, and the motion vector value mv$_{ORG}$ of the color component concerned are obtained.

The motion vector value mv$_{ORG}$ is the motion vector of each of the color components output from the respective first to third motion prediction units 114 to 116.

Subsequently, the inter-picture difference value SAD$_{ORG}$ between the prediction image of the coding block concerned and the reference image is calculated using the reference image number ref_idx$_{ORG}$ and the motion prediction information as the motion vector mv$_{ORG}$ (step S2102).

It is then determined whether the determination result of the reference image number comparing operation is necessity of correction only on any of the color components or necessity of correction on all the color components (step S2103).

If correction is required only on the reference image number of a specific color (FALSE in step S2103), the reference image number of the color component that is other than the correction target is set as a correction reference image number ref_idx$_{CORR}$ (step S2105).

In contrast, if the reference image numbers of all color components are required to be corrected (TRUE in step S2103), ref_idx value having the image number with the smallest temporal distance from a start point that is the coding image position among all the color components is set as the correction reference image number ref_idx$_{CORR}$ (step S2104).

Subsequently, the correction motion vector mv$_{CORR}$ is calculated by the proportional arithmetic, from the before-correction motion vector mv$_{ORG}$, based on the reference image number ref_idx$_{CORR}$ set in step S2104 or S2105 and the reference distance of the before-correction reference image number ref_idx$_{ORG}$ (step S2106). A method is adopted where, if the reference direction is reversed, the sign of the vector component is reversed, and, if the temporal distance of reference image position becomes N-fold, the element of the vector component is multiplied by N, according to proportional arithmetic.

The inter-picture difference value $SAD_{CORR}$ is calculated as in step S2102, on the coding block of the color component of the reference image number correction target, from the correction reference image number $ref\_idx_{CORR}$ and the motion vector $mv_{CORR}$ (step S2107).

Subsequently, in step S2108, the difference between the inter-picture difference $SAD_{CORR}$ at the reference image number correction and the before-correction inter-picture difference value $SAD_{ORG}$ is obtained, it is determined whether the difference is less than the predetermined value or not. Through the determination step, the reference image number to be actually coded is determined. Accordingly, as a result, the adverse effect which the vector indicates the reference image having the large inter-picture difference value, making the image quality deterioration conspicuous is preliminarily prevented.

If the difference between the inter-picture differences is at least the predetermined value (FALSE in step S2108), the motion prediction result indicates that the reference image number is different from that of the other color components, it is determined that the motion of the actual object is allowed to be followed in comparison with the case of applying the reference image number correction. As a result, the reference image number is not corrected, the motion vector $mv_{ORG}$ and the $ref\_idx_{ORG}$ are notified to the motion compensation unit 110, and this operation is finished (step S2109).

In contrast, if the difference between the inter-picture differences is not large even after application of the correction reference image number $ref\_idx_{CORR}$ (TRUE in step S2108), the following determination is made. It is determined to exert advantageous effects where the reference image number can be arranged with the reference numbers of the other color components almost without visual image quality deterioration at the coding block level, and image quality deterioration on a picture basis and between pictures can be also prevented.

The reference image number corrected to the $ref\_idx_{CORR}$ value based on the motion vector $mv_{CORR}$ and the $ref\_idx_{ORG}$ in the coding block of the color component concerned, is notified and output as the coding parameters to the motion compensation unit 110 (step S2110).

The reference image number correcting operation of the third embodiment of the present invention has thus been described above.

Reference Image Number Correcting Operation Example

Subsequently, the operation example according to the present embodiment will be described with reference to FIGS. 22A, 22B, 23A and 23B.

Figure 22A:
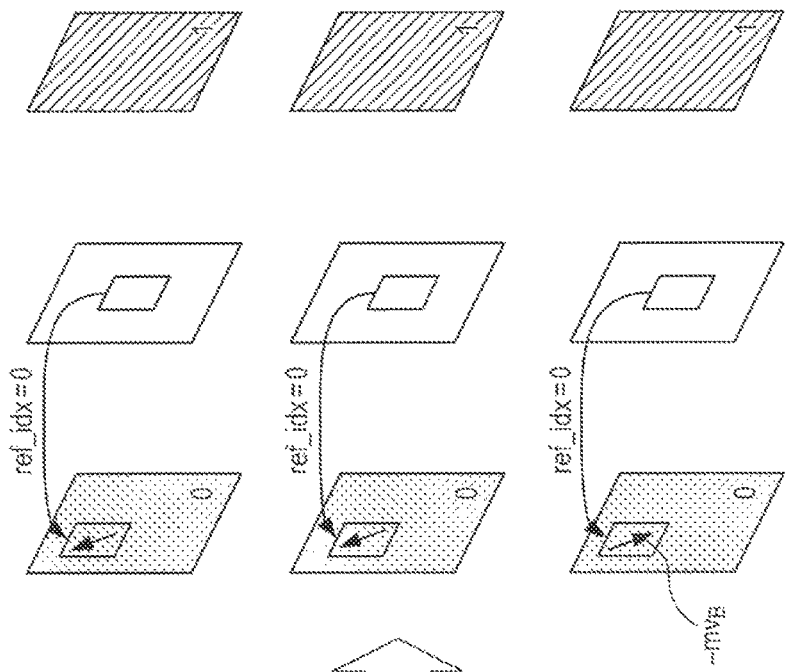
FIGS. 22A and 22B are schematic diagrams of correcting the reference image numbers according to the third embodiment of the present invention.
Figure 22B:
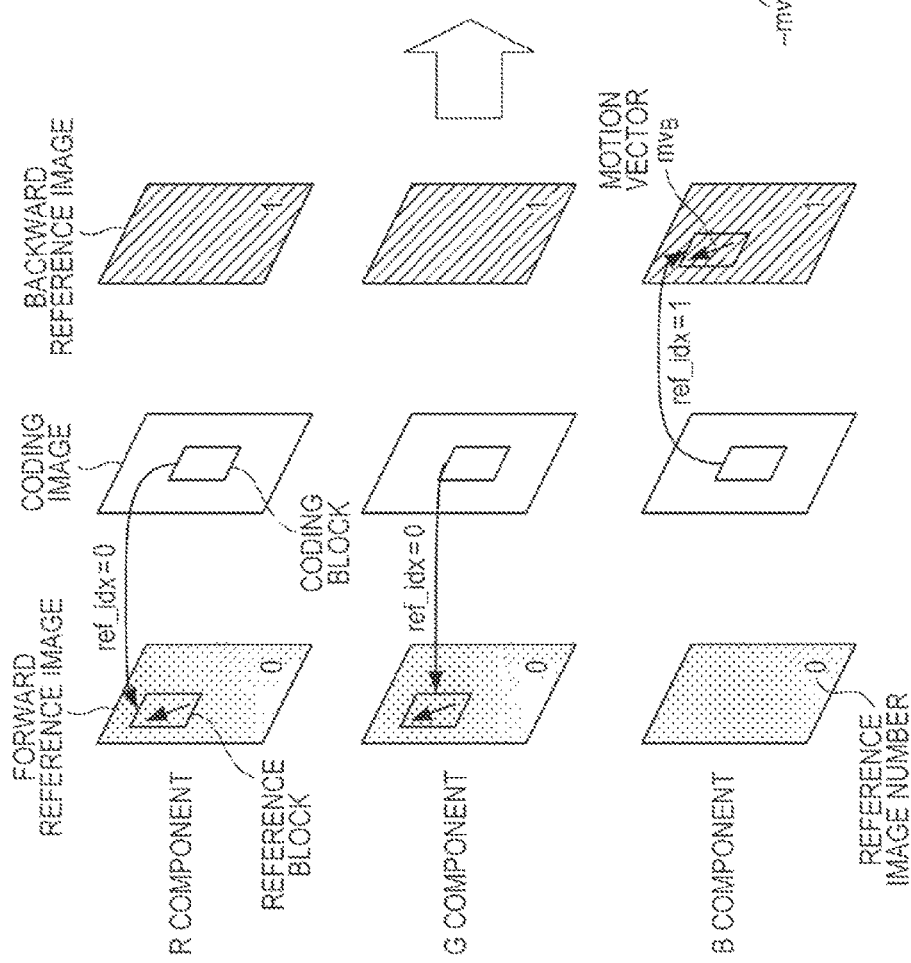

The example of FIGS. 22A and 22B illustrate coding target images of three components, i.e., RGB in the case of motion prediction at the same coding block position before (FIG. 22A) and after (FIG. 22B) correcting the reference image number. In the example of the drawings, the configuration has one or three forward reference images which are referred to as previous images with respect the coding target image. However, for implementing the present invention, the reference direction and the number of images are not limited to the illustrated configuration.

In the example of the drawings, on the R component and the G component, as a result of the motion prediction unit, the frame image having a reference image number of zero, i.e., the forward reference image, is motion-vector-predicted. In contrast, on the B component, the frame image having a reference image number of one, i.e., the backward reference image, is motion-vector-predicted.

In the present embodiment, in comparison with the first and second embodiments where only the motion vector value is the correction target, image quality deterioration that may occur if motion vectors are the same among the color components but the reference images are different from each other can be prevented. That is, the reference relationship in the temporal axis direction can be identified so as to be arranged in each color component, or the reference image numbers can be corrected and coded on all the color components.

More specifically, as illustrated in FIG. 22B, the reference image number ref_idx of the B component is changed from one to zero, which is identical to that of the R component and that of the G component, and then coded. On the motion vector $mv_B$ of the B component, the time direction is reversed between the directions of the original reference image number and the after-correction (corrected) reference image number. Accordingly, coding is performed using the vector $(-mv_B)$ whose sign is reversed to invert the direction of the vector.

In the examples of FIGS. 23A to 23B, the reference image numbers before (FIG. 23A) and after (FIG. 23B) correction in the case where the reference image numbers of all the color components at the same coding block position are illustrated.

In FIG. 23A, the frame image where the R component corresponds to the reference image number 2, the frame image where the G component corresponds to the reference image number 0, and the frame image where the B component corresponds to the reference image number 1 are referred to and vector prediction is performed.

According to the present embodiment, if each color component has a different reference image number, the reference image number is corrected such that all the color components refer to the position temporally nearest from the coding image position, i.e., the frame image with the image number 0 (FIG. 23B). The motion vector of each color component is corrected to motion vectors $mv_R'$ and $mv_B'$ acquired by multiplying the original motion vector $mv_R$ by ⅓ and by multiplying the vector $mv_b$ by ½ based on the reference distance before and after correcting the reference image number.

As described above, according to the present embodiment, the motion prediction information can be corrected in consideration not only of the direction and magnitude of the motion vector but also of the temporal axis direction. Accordingly, image quality deterioration can be prevented that is to occur when the object moves between the pictures and an image having a specific color component largely different from the other color components is referred to.

Fourth Embodiment

In the third embodiment, the reference image numbers of the color components are compared with each other. If there is a color component having a reference image number different from the numbers of the other components, the reference image number is corrected to an appropriate reference image number, and the corresponding motion vector is also corrected. At this time, in terms of the reference image number before and after correction, the value derived from the proportional relationship based on before-and-after relationship of the time direction and the temporal distance is applied to the motion vector correction.

The fourth embodiment has a configuration that the motion vector correction according to the first and second embodiments performs after the correction of the reference image number and the corresponding motion vector correction according to the third embodiment. According to this configuration, the reference image number correction allows motion prediction where each color component is based on the reference image number at the same time, and subsequently the motion vector is further corrected to enable the optimal value to be derived.

The fourth embodiment of the present invention will hereinafter be described with reference to drawings. In the description of the present embodiment, the same symbols are assigned to the components common to those of the first to third embodiments, and description thereof is appropriately omitted. In particular, the reference image number comparing operation in the present embodiment is identical to that of the third embodiment.

System Configuration

Figure 24:
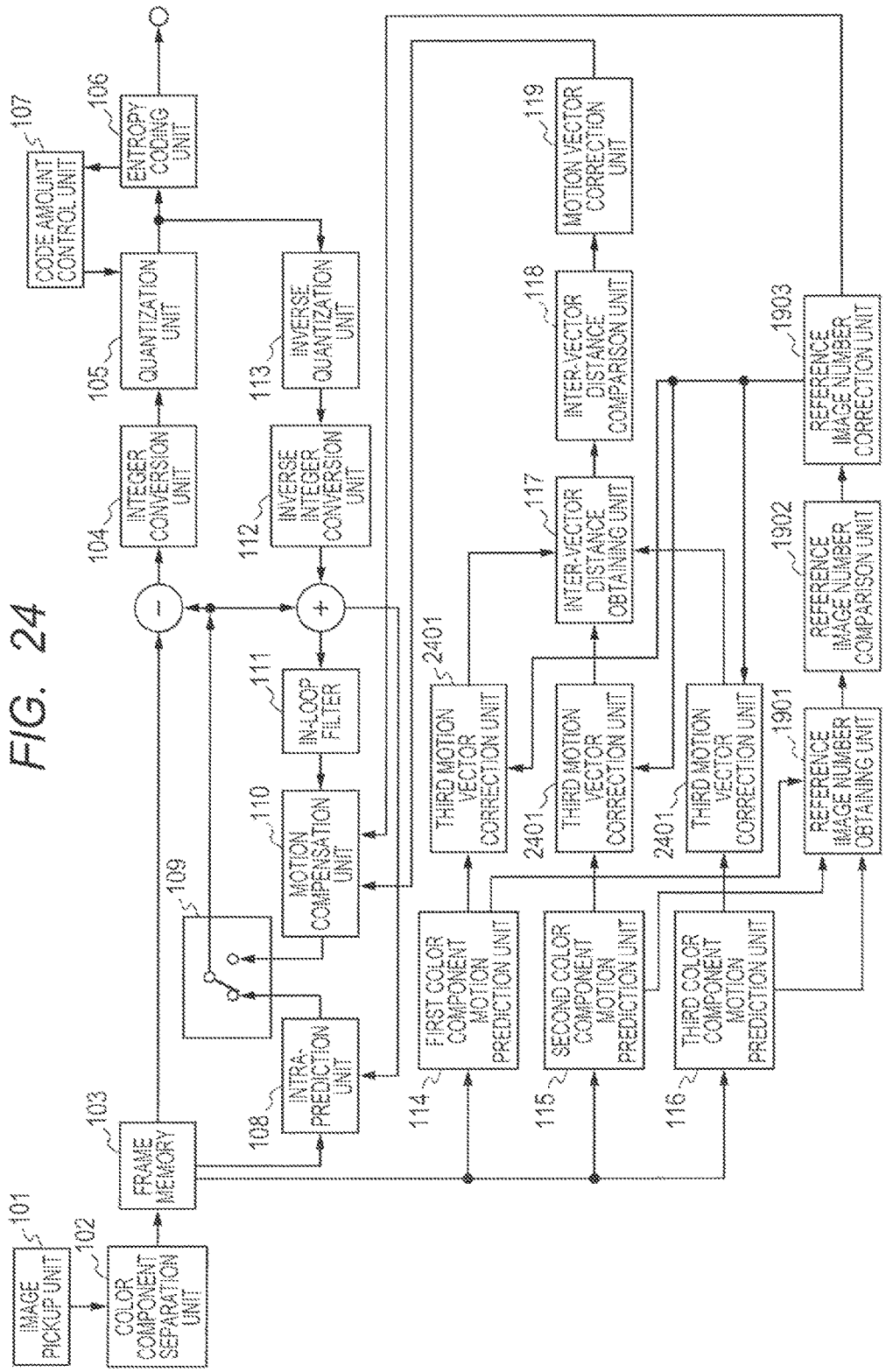
FIG. 24 is a block diagram of a coding system including a moving image coding apparatus according to a fourth embodiment of the present invention.

FIG. 24 is a block diagram illustrating a configuration of a moving image coding system where the moving image coding apparatus according to the fourth embodiment of the present invention is applied to an image pickup apparatus, such as a video camera. The system of the present embodiment includes all the components of the system configuration described in the first to third embodiments.

As in the first embodiment, the moving image coding apparatus according to the present embodiment may also be provided as an apparatus which includes the components of the moving image coding system but from which the image pickup unit 101 and the color component separation unit 102 are excluded and which can be executed by a computer. For instance, this apparatus may be provided as a moving image coding apparatus or method executed by an information processing apparatus, such as a PC, according to a program or partial combination with hardware.

Also in the present embodiment of the present invention, for the sake of description, input of an image of RGB three primary colors is assumed, and the first color component is the R component, the second color component is the G component, and the third color component is the B component. However, this configuration is not limited thereto in the present invention.

A motion compensation unit 110 of the present embodiment receives prediction image data filter-processed by the in-loop filter 111. This configuration is analogous to the configurations of the first to third embodiments. Furthermore, the present embodiment receives, as coding parameters, the after-correction reference image number notified from the reference image number correction unit 1903 and the motion vector notified from the motion vector correction unit 119. The motion compensation unit 110 generates reference image data to be used for inter-coding, based on the received information, and stores the data in the frame memory 103.

A third motion vector correction unit 2401 switches motion vector correction according to the proportional arithmetic in the third embodiment, and the before-correction motion vectors from the motion prediction units 114, 115 and 116 for the respective first to third color components. The switched motion vectors are notified to the inter-vector distance obtaining unit 117.

The configuration of the moving image coding system in the fourth embodiment of the present invention has thus been described.

Reference Image Number Correction

Figure 25:
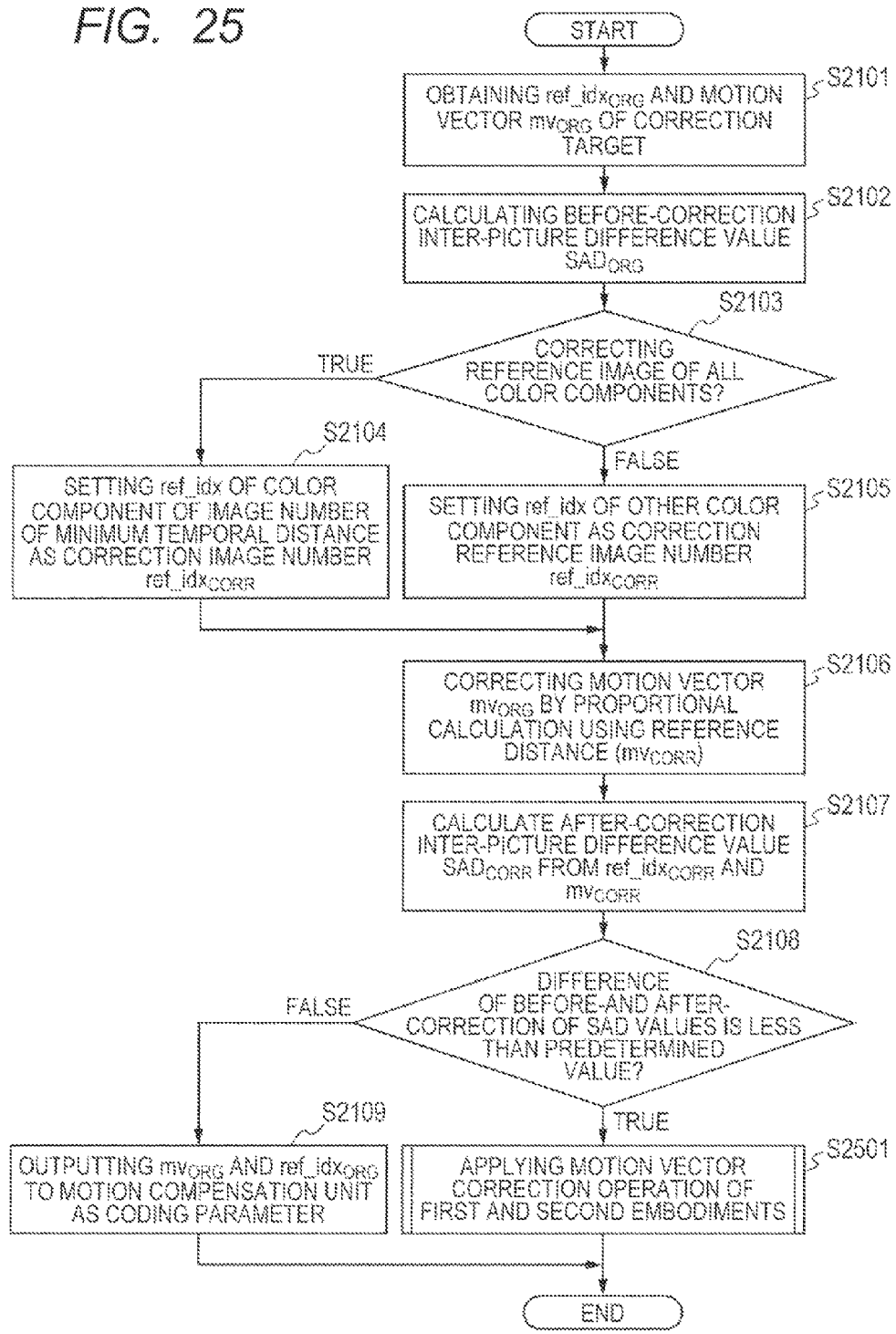
FIG. 25 is a diagram illustrating a flowchart of an operation of correcting the reference image number in the moving image coding apparatus according to the fourth embodiment of the present invention.

A reference image number correcting operation of the fourth embodiment of the present invention will hereinafter be described with reference to a flowchart of FIG. 25.

This operation is executed by the reference image number correction unit 1903 and the second motion vector correction unit 1904 of the moving image coding apparatus according to the present embodiment.

Steps S2101 to S2109 in the flowchart are identical to the steps of reference image number correction in the third embodiment.

According to the present embodiment, the operation in the case of determining that the inter-picture difference before and after correction is small and the motion vector and a corrected value of the reference image number are required to be output (FALSE) in step S2108, is different from the operation in the third embodiment. In this case, according to the present embodiment, ref_idx$_{CORR}$ as the corrected reference image number is notified and output to the motion compensation unit 110, and, for each color component, the motion vector mv$_{coRR}$ corrected by the proportional arithmetic is notified to the inter-vector distance obtaining unit 117. The inter-vector distances between the color components are calculated according to any of the methods in the first and second embodiments to optimally correct the motion vector, and subsequently notification and output to the motion compensation unit 110 are made (step S2501). The reference image number correcting operation of the fourth embodiment of the present invention has thus been described above.

Reference Image Number Correction Application Example

An example of an operation of the present embodiment will be described with reference to FIGS. 26A to 26C.

Figures 26A, 26B, 26C:
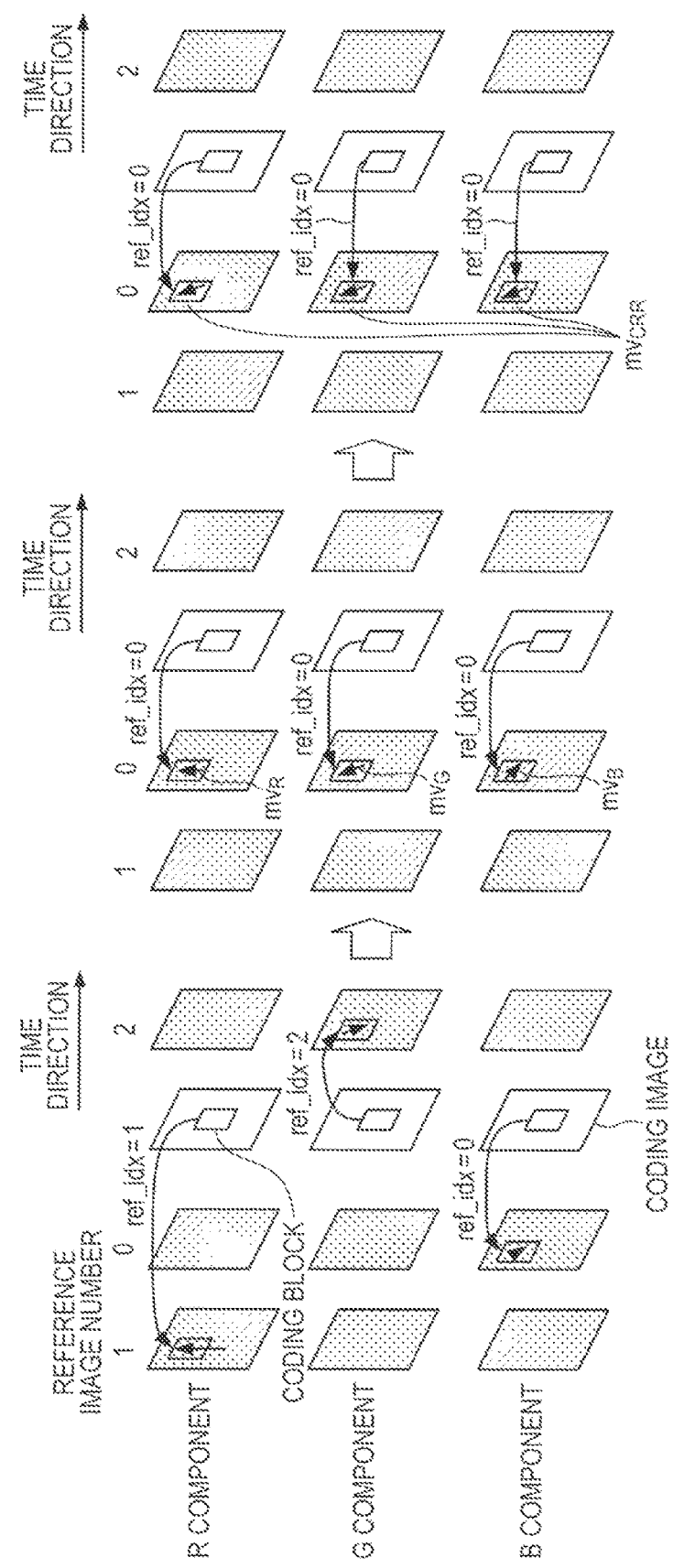
FIGS. 26A, 26B and 26C are schematic diagrams of correcting the reference image numbers according to the fourth embodiment of the present invention.

FIGS. 26A to 26C illustrate an operation of correcting motion prediction information according to the present embodiment, at the same coding block position in the coding target image of three RGB components. FIG. 26A illustrates a correction operation after vector search and before reference image number correction. FIG. 26B illustrates correction operation after reference image number correction and motion vector correction by proportional arithmetic. FIG. 26C illustrates a state after motion vector correction based on the inter-vector distance.

In the examples of FIGS. 26A to 26C, the configuration includes two forward reference images for previous image reference, and one backward reference image for future image reference, with respect to the coding target image. However, as with the third embodiment, for implementing the present invention, the reference direction and the number of images are not limited to those of the illustrated configuration.

In FIG. 26A, the R component refers to a frame image having a forward reference image number one, the G component refers to a frame image having a backward reference image number two, and the B component refers to a frame image having a forward reference image number zero, thereby performing vector prediction.

As with the third embodiment, if each color component has a different reference image, the reference image number is corrected such that the frame image with the reference image number 0 at the position temporally nearest from the coded picture position is referred to (FIG. 26B). Likewise, the motion vector of the corrected color component is also corrected based on the proportional relationship of the reference distance before and after correcting the reference image number.

Furthermore, in the present embodiment, after the reference image numbers of the respective color components are corrected and arranged, the motion vectors of the respective color components corrected by the proportional arithmetic are subjected to a series of vector corrections based on the distances between the motion vectors of the first or second embodiment.

In FIG. 26B, it is assumed that the motion vectors of the color components after correction according to the proportional arithmetic are calculated as values having different lengths and directions. These motion vectors are subsequently corrected to the common $mv_{CRR}$ according to the distances between the motion vectors of the respective color components according to the first or second embodiment (FIG. 26C).

The reference image number and motion vector correction according to the fourth embodiment of the present invention has thus been described above. The present invention can provide the moving image coding apparatus that can reduce image quality deterioration due to out-of-color registration in coding that motion-predicts, for each color component, the moving image including a plurality of color components having the same sample ratio.

Other Embodiments

The units included in the recording device and the steps in the recording method according to the embodiment of the present invention may be actualized by executing a program stored in RAM or ROM of a computer. This program and a computer-readable storing medium stored with the program are included in the present invention.

The present invention may be implemented as embodiments that are, for instance, a system, an apparatus, a method, a program, and a storing medium. More specifically, the present invention is applicable to a system including a plurality of apparatuses, and also to an apparatus including a piece of equipment.

The present invention also includes the case where a program (program corresponding to the illustrated flowcharts) of software actualizing the functions of the embodiments is provided directly or remotely for a system or an apparatus. The present invention further includes the case where the computer of the system or the apparatus reads the provided program codes and executes the codes to achieve this invention.

Accordingly, the program codes themselves installed in the computer for actualizing the functional processes of the present invention in the computer also implement the present invention. That is, the present invention includes the computer program itself for actualizing the functional processes of the present invention. In this case, any of modes, such as object codes, a program executed by an interpreter, and script data to be provided for an OS, may be adopted only if the mode has the functions of the program.

The storing medium for providing the program may be, for instance, any of a flexible disk, a hard disk, an optical disk, and an magneto-optical disk. Furthermore, the medium may be any of an MO, a CD-ROM, a CD-R, a CD-RW, a magnetic tape, a nonvolatile memory card, a ROM, and a DVD (DVD-ROM, and DVD-R).

There is another method of providing a program that connects to a web page of the Internet through use of a browser of a client computer. The program can be provided by downloading, from the web site, a computer program itself of the present invention or a file that has been compressed and contains an automatic installation program into a storing medium, such as a hard disk.

The present invention can also be actualized by dividing the program codes configuring the program of the present invention into multiple files and then downloading the files from different web sites. That is, the present invention also includes a WWW server allowing multiple users to download a program file for actualizing the functional process of the present invention.

According to another method, the program of the present invention is encrypted, stored in a storing medium, such as a CD-ROM, distributed to users, and allows users satisfying predetermined conditions to download key information for decryption from the web site via the Internet. The program encrypted using the key information can be executed, and installed into the computer to actualize this invention.

The computer executes the read program to allow the functions of the embodiment to be actualized.

According to instructions of the program, the OS operating on the computer executes a part or all the parts of actual processes, and the processing thereof can actualize the functions of the present embodiment.

According to still another method, first, the program read from the storing medium is written into a memory included in an function extension board inserted into a computer or a function extension unit connected to the computer. Based on instructions of the program, a CPU included in the function extension board or the function extension unit executes a part or all parts of actual processes, and the processing thereof can actualize the functions of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-271615, filed Dec. 12, 2012, which is hereby incorporated by reference herein in its entirety.

What is claimed is:

1. A moving image coding apparatus for motion-prediction coding a moving image including a plurality of color components on a color component basis, comprising:
a processor; and
a memory storing a program which, when executed by the processor, causes the moving image coding apparatus to:
obtains obtain the plurality of color components configuring the moving image;
generate at least one motion prediction information for prediction-coding a coding-target image of the obtained color components, for each color component;
determine a correlation relationship of at least one motion prediction information of each color component;
determine a color component which is to be a correction target, on the basis of a result of the determination of the correlation relationship;
correct at least one motion prediction information of the determined color component using the motion prediction information corresponding to at least one color component among the other color components;
prediction-code the coding-target image of each color component using corrected coding parameters;
if at least one motion prediction information of the color component to be the correction target is corrected, calculate an inter-picture difference value between a reference image according to at least one motion prediction information of a color component as the correction target and the coding target image, and an inter-picture difference value between the reference image in a case of using motion prediction information corresponding to the other color component instead of at least one motion prediction information of the color component of the correction target and the coding target image;

if a difference of the calculated inter-picture difference values is equal to or less than a predetermined value, output the corrected motion prediction information of the color component of the correction target and the motion prediction information of the other color component as the coding parameters; and if the difference is more than the predetermined value, output uncorrected motion prediction information of the color component of the correction target and the motion prediction information of the other color component as the coding parameters.

2. The moving image coding apparatus according to claim 1, wherein the at least one motion prediction information is a motion vector, and wherein the program, when executed by the processor, further causes the moving image coding apparatus to, if a distance between the motion vectors of the color components is greater than or equal to a predetermined value, determine a color component other than the color component having a minimum inter-vector distance as the correction target.

3. The moving image coding apparatus according to claim 2, wherein the program, when executed by the processor, further causes the moving image coding apparatus to correct the motion vector of the color component determined as the correction target to an average vector of motion vectors of the other color components.

4. The moving image coding apparatus according to claim 2, wherein the program, when executed by the processor, further causes the moving image coding apparatus to correct the motion vector of the color component determined as the correction target, to the motion vector of the other color component that has a smallest distance from the motion vector of the color component determined as the correction target.

5. The moving image coding apparatus according to claim 2, wherein the program, when executed by the processor, further causes the moving image coding apparatus to correct the motion vector of the color component determined as the correction target to the motion vector of the other color component that has a smallest inter-picture difference value between the reference image according to the motion vector of the other color component and the coding target image.

6. The moving image coding apparatus according to claim 1, wherein the at least one motion prediction information is a motion vector, and wherein the program, when executed by the processor, further causes the moving image coding apparatus to:

set the motion vector of a predetermined color component among the color components as a reference vector; and if a distance between the reference vector and the motion vector of each color component other than the predetermined color component is greater than or equal to a predetermined value, determine the color component other than the predetermined color component as the correction target, and corrects the motion vector of the determined color component to the reference vector.

7. The moving image coding apparatus according to claim 6, wherein the program, when executed by the processor, further causes the moving image coding apparatus to, if the obtained color components include three primary colors that are red, green, and blue, set the motion vector of the green color component as the reference vector.

8. The moving image coding apparatus according to claim 6, wherein the program, when executed by the processor, further causes the moving image coding apparatus to set, as the reference vector, the motion vector of the color component determined according to a photographing mode designated by a user.

9. The moving image coding apparatus according to claim 6, wherein the program, when executed by the processor, further causes the moving image coding apparatus to set, as the reference vector, the motion vector of the color component that has a smallest inter-picture difference value between the reference image according to the corresponding motion vector and the coding target image.

10. The moving image coding apparatus according to claim 6, wherein the program, when executed by the processor, further causes the moving image coding apparatus to generate a histogram of pixel values of the coding target image of each color component, and sets, as the reference vector, the motion vector of the color component corresponding to the histogram representing a widest distribution of the pixel values.

11. The moving image coding apparatus according to claim 1, wherein the at least one motion prediction information is a motion vector and a reference image number, and wherein the program, when executed by the processor, further causes the moving image coding apparatus to:

determine a correlation relationship of the reference image numbers of the color components, and, if only one color component does not have correlation as a result of the determination;

determine the one color component as the correction target, and, if the reference image numbers of the plurality of color components do not have correlation;

determine, as the correction target, a color component other than the color component of the reference image number representing the reference image most similar to the coding target image;

correct the reference image number of the determined color component using the reference image number of the other color component; and correct the motion vector of the color component that is the correction target with the corrected reference image number, using proportional arithmetic according to distances of the reference image indicated by an uncorrected reference image number of the color component that is the correction target and the reference image indicated by the corrected reference image number.

12. The moving image coding apparatus according to claim 11, wherein the program, when executed by the processor, further causes the moving image coding apparatus to, if only one color component does not have correlation, correct the reference image number of the color component of the correction target to the reference image number having correlation to the other color component, and, if reference image numbers of the plurality of color components do not have correlation, correct the reference image number of the correction target to the reference image number indicating the reference image most similar to the coding target image.

13. The moving image coding apparatus according to claim 11, wherein the program, when executed by the processor, further causes the moving image coding apparatus to correct the motion vector.

14. A method of controlling a moving image coding apparatus for motion-prediction coding a moving image including a plurality of color components on a color component basis, comprising:

obtaining the plurality of color components configuring the moving image;

generating at least one motion prediction information for prediction-coding a coding-target image of the obtained color components, for each color component;

determining a correlation relationship of at least one motion prediction information of each color component;

determining a color component which is to be a correction target, on the basis of a result of the determination of the correlation relationship;

correcting at least one motion prediction information of the determined color component using the motion prediction information corresponding to at least one color component among the other color components;

prediction-coding the coding-target image of each color component using corrected coding parameters;

if at least one motion prediction information of the color component to be the correction target is corrected, calculating an inter-picture difference value between a reference image according to at least one motion prediction information of a color component as the correction target and the coding target image, and an inter-picture difference value between the reference image in a case of using motion prediction information corresponding to the other color component instead of at least one motion prediction information of the color component of the correction target and the coding target image;

if a difference of the calculated inter-picture difference values is equal to or less than a predetermined value, outputting the corrected motion prediction information of the color component of the correction target and the motion prediction information of the other color component as the coding parameters; and if the difference is more than the predetermined value, outputting uncorrected motion prediction information of the color component of the correction target and the motion prediction information of the other color component as the coding parameters.

15. A non-transitory computer-readable storage medium storing a program comprising a program code for causing a computer to execute a method of controlling a moving image coding apparatus that comprises the control method according to claim 14.

* * * * *